(12) United States Patent
Wang et al.

(10) Patent No.: US 12,224,939 B2
(45) Date of Patent: Feb. 11, 2025

(54) SERVICE PACKET FORWARDING METHOD, APPARATUS, AND COMPUTER STORAGE MEDIUM

(71) Applicant: HUAWEI TECHNOLOGIES CO., LTD., Shenzhen (CN)

(72) Inventors: Fang Wang, Beijing (CN); Jianbin Xu, Beijing (CN); Tao Bai, Shenzhen (CN); Yongkang Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 17/732,066

(22) Filed: Apr. 28, 2022

(65) Prior Publication Data

US 2022/0255864 A1  Aug. 11, 2022

Related U.S. Application Data

(63) Continuation of application No. PCT/CN2020/105842, filed on Jul. 30, 2020.

(30) Foreign Application Priority Data

Oct. 29, 2019  (CN) .......................... 201911039730.1

(51) Int. Cl.
 *H04L 47/125* (2022.01)
 *H04L 47/122* (2022.01)
 *H04L 47/70* (2022.01)

(52) U.S. Cl.
 CPC .......... *H04L 47/125* (2013.01); *H04L 47/122* (2013.01); *H04L 47/828* (2013.01); *H04L 47/829* (2013.01)

(58) Field of Classification Search
 CPC ... H04L 47/125; H04L 47/122; H04L 47/828; H04L 47/829
 See application file for complete search history.

(56) References Cited

U.S. PATENT DOCUMENTS 9,686,181 B2 * 6/2017 Akiya ..................... H04L 45/28
9,967,136 B2 * 5/2018 Krishnan ................ H04L 41/12
(Continued)

FOREIGN PATENT DOCUMENTS

CN   105553751 A   5/2016
CN   106487556 A   3/2017
(Continued)

OTHER PUBLICATIONS

A. Farrel et al, An MPLS-Based Forwarding Plane for Service Function Chaining; draft-farrel-mpls-sfc-04, 2018, 28 pages.
(Continued)

*Primary Examiner* — Bailor C Hsu
(74) *Attorney, Agent, or Firm* — Rimon PC

(57) ABSTRACT

This application discloses a service packet forwarding method and related apparatus. In the service packet forwarding method, when receiving a packet sent by any second virtual resource module connected to a first service function forwarder (SFF), the first SFF dynamically determines a forwarding path of the packet based on configuration information of a second virtual resource module for implementing a second service function, to achieve dynamic load balancing on the packet instead of relying on a service function chain ingress node to perform load balancing, so as to reduce pressure on the service function chain ingress node.

16 Claims, 17 Drawing Sheets

---

A first SFF receives a packet sent by one first virtual resource module connected to the first SFF, and the first SFF determines a second service function based on the packet  ~ 901

The first SFF obtains configuration information of a second virtual resource module for implementing the second service function  ~ 902

The first SFF forwards, based on the configuration information of the second virtual resource module, the packet to one second virtual resource module connected to the first SFF or one of one or more second SFFs  ~ 903

(56) References Cited

U.S. PATENT DOCUMENTS

| | | | |
|---|---|---|---|
| 10,355,983 B2 * | 7/2019 | Penno | H04L 67/63 |
| 10,374,833 B2 * | 8/2019 | Bottorff | H04L 12/6418 |
| 10,547,563 B2 * | 1/2020 | Zhang | H04L 47/785 |
| 10,812,393 B2 * | 10/2020 | Fedyk | H04L 41/5041 |
| 10,819,573 B2 * | 10/2020 | Maes | H04L 41/0859 |
| 2017/0005920 A1 * | 1/2017 | Previdi | H04L 12/4633 |
| 2017/0214627 A1 * | 7/2017 | Zhang | H04L 67/1023 |
| 2017/0244631 A1 * | 8/2017 | Guichard | H04L 45/306 |
| 2018/0198705 A1 | 7/2018 | Wang et al. | |
| 2018/0359255 A1 | 12/2018 | Stair et al. | |
| 2019/0036818 A1 * | 1/2019 | Nainar | H04L 45/34 |
| 2020/0389401 A1 * | 12/2020 | Enguehard | H04L 45/745 |
| 2021/0119696 A1 * | 4/2021 | Shah | H04L 45/02 |
| 2021/0126831 A1 * | 4/2021 | Filsfils | H04W 76/12 |

FOREIGN PATENT DOCUMENTS

| | | |
|---|---|---|
| CN | 107925624 A | 4/2018 |
| CN | 109417496 A | 3/2019 |
| IN | 108476243 A | 8/2018 |
| WO | 2017125073 A1 | 7/2017 |

OTHER PUBLICATIONS

Clad F. C et al: "Segment Routing for Service Chaining draft-xuclad-spring-sr-service-chaining-01",IETF, Mar. 5, 2018 (Mar. 5, 2018), XP055919994, D2 Retrieved from the Internet:URL:https://datatracker.ietf.org/doc/pdf/draft-xuclad-spring-srservice-chaining-01[retrieved on May 11, 2022].

P. Psenak, Ed et al, IS-IS Extensions to Support Routing over IPv6 Dataplane, draft-bashandy-isis-srv6-extensions-05.txt, Networking Working Group, Mar. 6, 2019, total 21 pages.

J. Halpern, Ed., Service Function Chaining (SFC) Architecture, 2015, rfc 7665, 32 pages.

C. Filsfils et al., "SRv6 Network Programming draft-filsfils-spring-srv6-network-programming-07",Huawei Technologies, Feb. 14, 2019,total:21pages.

* cited by examiner

| Type | Length | Control flag | Weight |
|---|---|---|---|
| SRv6 end node function | | | |
| SID | | | |
| ... | | | |
| SID | | | |
| ... | | | |
| Optional sub-sub-TLV | | | |

| Type | Length | Control flag | |
|---|---|---|---|
| SRv6 end node function | | | |
| SID | | | |
| ... | | | |
| SID | | | |

SERVICE PACKET FORWARDING METHOD, APPARATUS, AND COMPUTER STORAGE MEDIUM

CROSS-REFERENCE TO RELATED APPLICATIONS

This application is a continuation of International Application No. PCT/CN2020/105842, filed on Jul. 30, 2020, which claims priority to Chinese Patent Application No. 201911039730.1, filed on Oct. 29, 2019. The disclosures of the aforementioned applications are hereby incorporated by reference in their entireties.

TECHNICAL FIELD

This application relates to the field of routing technologies, and in particular, to a service packet forwarding method, an apparatus, and a computer storage medium.

BACKGROUND

When a packet is transmitted in a network to provide a user with a secure, fast, and stable network service, the packet needs to be processed sequentially based on a plurality of service functions (SFs) included in a configured service function chain. The plurality of service functions may include service functions such as traffic cleaning, deep packet inspection, and network acceleration. For any service function, a plurality of virtual resource modules for implementing the service function may be correspondingly configured. When packets need to be processed based on the service function, the packets are offloaded onto each virtual resource module, and each virtual resource module processes some received packets based on the service function, to improve packet processing efficiency. This process is also referred to as load balancing. The virtual resource module may be a virtual machine (VM) or a container in a virtual container network.

In a related technology, a virtual resource module is connected to a service function forwarder (SFF). Therefore, assuming that any SFF is connected to one virtual resource module corresponding to a service function, a control node may allocate a segment identifier (SID) to the virtual resource module based on a locator of the SFF in a segment routing (SR) network. In this way, the control node may obtain a SID of each of a plurality of virtual resource modules corresponding to the service functions on a service function chain, and then orchestrate, based on the SID of each of one or more virtual resource modules corresponding to the service functions, a plurality of segment routing policies (SR policies) that can be used to implement the services on the service function chain. Each segment routing policy is used to indicate a SID list, and a plurality of SIDs included in the SID list are in a one-to-one correspondence with the plurality of service functions on the service function chain. Subsequently, packets are offloaded on a service function chain ingress node according to a determined segment routing policy, and each offloaded packet is forwarded based on a SID list indicated by the corresponding segment routing policy, so that all packets are processed based on the service functions on the service function chain. The service function chain ingress node steers the packet to an SFF for implementing a first service function on the service function chain.

In the foregoing load balancing process, the control node needs to pre-orchestrate all segment routing policies. When the service function chain includes many service functions, and each service function corresponds to multiple virtual resource modules, the efficiency of orchestrating all the segment routing policies is very low. In addition, all the packets are offloaded on the service function chain ingress node according to the determined segment routing policy, and consequently the workload pressure on the service function chain ingress node is high. Moreover, when a virtual resource module correspondingly configured for a service function changes, the control node needs to re-orchestrate all segment routing policies. Consequently, the related packet processing process becomes more complex.

SUMMARY

This application provides a service packet forwarding method, an apparatus, and a computer storage medium, to reduce data processing pressure on a service function chain ingress node, and reduce packet forwarding complexity when a virtual resource module correspondingly configured for a service function changes. The technical solutions are as follows:

According to a first aspect, a service packet forwarding method is provided, and applied to a first SFF in a communications network. The first SFF is any SFF connected to one or more first virtual resource modules. The communications network further includes one or more second SFFs, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function. In the method, the first SFF receives a packet sent by one first virtual resource module connected to the first SFF. The first SFF determines the second service function based on the packet. The first SFF obtains configuration information of the second virtual resource module for implementing the second service function. The first SFF forwards, based on the configuration information of the second virtual resource module, the packet to one second virtual resource module connected to the first SFF or one of the one or more second SFFs.

In some embodiments of this application, an SFF connected to the second virtual resource module in the communications network is one or more second SFFs, or one or more second SFFs and a first SFF. Therefore, the configuration information of the second virtual resource module includes at least configuration information of the second virtual resource module connected to the second SFF in the communications network. In this way, when receiving a packet sent by any second virtual resource module connected to the first SFF, the first SFF may dynamically determine a forwarding path of the packet based on the configuration information of the virtual resource module for implementing the second service function, to implement dynamic load balancing on the packet instead of uniformly performing load balancing by a service function chain ingress node, so as to reduce pressure on the service function chain ingress node.

Optionally, the configuration information of the second virtual resource module includes an identifier and a weight of each second virtual resource module connected to the first SFF, an identifier of each of the one or more second SFFs, and a weight of a second resource module connected to each second SFF. In this case, that the first SFF forwards, based on the configuration information of the second virtual resource module, the packet to one second virtual resource module connected to the first SFF or one of the one or more second SFFs may be described as follows: The first SFF forwards, based on the identifier and the weight of each second virtual resource module connected to the first SFF, the identifier of each of the one or more second SFFs, and the weight of the second resource module connected to each second SFF, the packet to the one second virtual resource module connected to the first SFF or the one of the one or more second SFFs.

When an SFF connected to the second virtual resource module in the communications network includes one or more second SFFs and a first SFF, the first SFF may forward, based on the weight in the configuration information, the packet to the one second virtual resource module connected to the first SFF or the one of the one or more second SFFs, to implement dynamic load balancing on the packet, and improve packet forwarding efficiency.

Optionally, the configuration information of the second virtual resource module includes an identifier of each of the one or more second SFFs and a weight of a second resource module connected to each second SFF. In this case, that the first SFF forwards, based on the configuration information of the second virtual resource module, the packet to one second virtual resource module connected to the first SFF or one of the one or more second SFFs may be described as follows: The first SFF forwards the packet to the one of the one or more second SFFs based on the weight of the second resource module connected to each second SFF.

When an SFF connected to the second virtual resource module in the communications network includes one or more second SFFs, the first SFF may also forward the packet to the one of the one or more second SFFs based on the weight in the configuration information, to implement dynamic load balancing on the packet, and improved packet forwarding efficiency.

Optionally, the configuration information of the second virtual resource module includes a plurality of entries, the plurality of entries include one or more local entries and one or more remote entries, each of the one or more local entries includes an identifier of the one second virtual resource module connected to the first SFF and a weight of the one second virtual resource module connected to the first SFF, and each of the one or more remote entries includes an identifier of one second SFF and a weight of a second virtual resource module connected to the second SFF corresponding to the identifier of the one second SFF. In this case, that the first SFF forwards, based on the identifier and the weight of each second virtual resource module connected to the first SFF, the identifier of each of the one or more second SFFs, and the weight of the second resource module connected to each second SFF, the packet to the one second virtual resource module connected to the first SFF may comprise the following: The first SFF determines, based on weights in the plurality of entries by using a hash algorithm, a first entry for forwarding the packet, where the first entry is one of the plurality of entries. The first SFF forwards, based on the first entry, the packet to the one second virtual resource module connected to the first SFF or the one of the one or more second SFFs.

When an SFF connected to the second virtual resource module in the communications network includes one or more second SFFs and a first SFF, the configuration information may be indicated by the local entry and the remote entry. In this way, during packet forwarding, an entry may be directly determined by using a hash algorithm, and the packet is forwarded based on the entry, to improve packet forwarding efficiency.

Optionally, the weight of the one second virtual resource module connected to the first SFF is a quantity 1, and the weight of the second virtual resource module connected to the second SFF corresponding to the identifier of the one second SFF is a quantity of second virtual resource modules connected to the second SFF corresponding to the identifier of the one second SFF; and the hash algorithm satisfies a condition that a ratio between probabilities of matching the packet with entities in the plurality of entries is the same as a ratio between quantities in entries in the plurality of entries.

When an SFF connected to the second virtual resource module in the communications network includes one or more second SFFs and a first SFF, to implement load balancing, the weight of the one second virtual resource module connected to the first SFF is the quantity 1, and the weight of the second virtual resource module connected to the second SFF corresponding to the identifier of the one second SFF is the quantity of second virtual resource modules connected to the second SFF corresponding to the identifier of the one second SFF. In this way, according to the service packet forwarding method provided in some embodiments of this application, user traffic can be evenly offloaded onto each second virtual resource module.

Optionally, the identifier of the one second virtual resource module connected to the first SFF is an interface identifier of the one second virtual resource module connected to the first SFF, and the identifier of the second SFF is a SID of the second SFF. In this case, that the first SFF forwards, based on the first entry, the packet to the one second virtual resource module connected to the first SFF or the one of the one or more second SFFs may comprise the following: The first SFF forwards, based on the interface identifier that is of the one second virtual resource module connected to the first SFF and that is included in the first entry and through a port indicated by the interface identifier, the packet to the one second virtual resource module connected to the first SFF. Alternatively, the first SFF forwards, based on the SID that is of the second SFF and that is included in the first entry, the packet to the second SFF indicated by the SID in the first entry.

Further, when an SFF connected to the second virtual resource module in the communications network includes one or more second SFFs and a first SFF, to quickly forward the packet to a final second virtual resource module for processing, configuration information of a locally connected second virtual resource module may include the interface identifier of the one second virtual resource module connected to the first SFF, to improve packet forwarding efficiency, and configuration information of a remote second SFF may include the SID of the second SFF, so that the packet can be forwarded based on the SID, and packet forwarding efficiency can also be improved.

Optionally, the configuration information of the second virtual resource module includes at least two remote entries, and each of the at least two remote entries includes an identifier of one second SFF and a weight of a second virtual resource module connected to the second SFF corresponding to the identifier of the one second SFF. In this case, that the first SFF forwards the packet to the one of the one or more second SFFs based on the weight of the second resource module connected to each second SFF may comprise the following: The first SFF determines, based on weights in the at least two remote entries by using a hash algorithm, a second entry for forwarding the packet, where the second entry is one of the at least two remote entries. The first SFF forwards, based on the second entry, the packet to the SFF corresponding to the identifier that is of the second SFF and that is in the second entry.

Similarly, when an SFF connected to the second virtual resource module in the communications network includes one or more second SFFs, the configuration information may be indicated by the remote entry. In this way, during packet forwarding, an entry may be directly determined by using a hash algorithm, and the packet is forwarded based on the entry, to improve packet forwarding efficiency.

Optionally, the weight of the second virtual resource module connected to the second SFF corresponding to the identifier of the one second SFF is a quantity of second virtual resource modules connected to the second SFF corresponding to the identifier of the one second SFF; and the hash algorithm satisfies a condition that a ratio between probabilities of matching the packet with remote entries in the at least two remote entries is the same as a ratio between quantities in remote entries in the at least two remote entries.

When an SFF connected to the second virtual resource module in the communications network includes one or more second SFFs, to implement load balancing, the weight of the second virtual resource module connected to the second SFF corresponding to the identifier of the one second SFF is the quantity of second virtual resource modules connected to the second SFF corresponding to the identifier of the one second SFF. In this way, according to the service packet forwarding method provided in some embodiments of this application, user traffic can be evenly offloaded onto each second virtual resource module connected to the second SFF.

Optionally, the identifier of the one second SFF is a SID of the one second SFF.

When an SFF connected to the second virtual resource module in the communications network includes one or more second SFFs, configuration information of a remote second SFF may include the SID of the second SFF, so that the packet can be forwarded based on the SID, and packet forwarding efficiency can also be improved.

Optionally, in the method, the first SFF may further receive SID notification information advertised by each of the one or more second SFFs, where the SID notification information includes an identifier of a second SFF that advertises the SID notification information and a weight of a second virtual resource module connected to the second SFF that advertises the SID notification information. The first SFF creates, based on the SID notification information advertised by each second SFF, a remote entry corresponding to each second SFF.

In some embodiments of this application, the first SFF may learn of, by using the SID notification information, the configuration information of the second virtual resource module connected to each second SFF, to dynamically perform load balancing subsequently.

Optionally, in the method, the first SFF may further obtain the identifier and the weight of each second virtual resource module connected to the first SFF. The first SFF creates, based on the identifier and the weight of each second virtual resource module connected to the first SFF, a local entry corresponding to each second virtual resource module.

When an SFF connected to the second virtual resource module in the communications network includes one or more second SFFs and a first SFF, the first SFF further needs to create a local entry based on a locally connected second virtual resource module, to implement load balancing in a subsequent packet forwarding process.

Optionally, in the method, the first SFF further advertises SID notification information to each of the one or more second SFFs, where the notification information includes a weight of a second virtual resource module connected to the first SFF and an identifier of the first SFF.

In some embodiments of this application, the first SFF may further advertise SID notification information to each second SFF, so that each second SFF learns of, by using the SID notification information, configuration information of the second virtual resource module connected to the first SFF, and each second SFF dynamically performs load balancing subsequently.

Optionally, the SID notification information is carried in a locator type-length-value TLV, the locator TLV includes a sub-TLV, the sub-TLV includes a SID field and a resource weight field, the SID field is used to indicate an identifier of an SFF that advertises the locator TLV, and the resource weight field is used to indicate a weight of a second virtual resource module connected to the SFF that advertises the locator TLV.

In some embodiments of this application, the existing locator TLV may be extended, so that the locator TLV can carry the SID notification information, to help promote the service packet forwarding method provided in some embodiments of this application.

Optionally, the configuration information of the second virtual resource module includes an identifier of each second virtual resource module connected to the first SFF and an identifier of each second virtual resource module connected to the one or more second SFFs, or an identifier of each second virtual resource module connected to the one or more second SFFs. In this case, that the first SFF forwards, based on the configuration information of the second virtual resource module, the packet to one second virtual resource module connected to the first SFF or one of the one or more second SFFs may comprise the following: The first SFF selects an identifier of one second virtual resource module according to a load balancing policy. The first SFF forwards, based on the selected identifier of the second virtual resource module, the packet to the one second virtual resource module connected to the first SFF or the one of the one or more second SFFs.

An embodiment of this application further provides other configuration information of a second virtual resource module for implementing a second service function. In this case, the configuration information of the second virtual resource module includes an identifier of each second virtual resource module connected to the first SFF and an identifier of each second virtual resource module connected to the one or more second SFFs, or an identifier of each second virtual resource module connected to the one or more second SFFs. In this way, the first SFF may directly forward the packet based on the identifier of each second virtual resource module.

Optionally, the configuration information of the second virtual resource module includes a plurality of entries, and each entry includes an identifier of one second virtual resource module connected to the first SFF or any second SFF. In this case, that the first SFF selects an identifier of one second virtual resource module according to a load balancing policy may comprise the following: The first SFF determines, by using a hash algorithm, a first entry for forwarding the packet, where the first entry includes the selected identifier of the second virtual resource module, the first entry is one of the plurality of entries, and the hash algorithm satisfies a condition that probabilities of matching the packet with entries in the plurality of entries are the same.

In some embodiments of this application, configuration information of each second virtual resource module may be further indicated by an entry. In this way, during packet forwarding, an entry may be directly determined by using a hash algorithm, and the packet is forwarded based on the entry, to improve packet forwarding efficiency.

Optionally, the identifier of each second virtual resource module is a SID of each second virtual resource module. In this case, that the first SFF forwards, based on the selected identifier of the second virtual resource module, the packet to the one second virtual resource module connected to the first SFF or the one of the one or more second SFFs may comprise the following: The first SFF forwards, based on an interface identifier that is of the second virtual resource module and that is indicated by the selected SID of the second virtual resource module and through a port indicated by the interface identifier, the packet to the one second virtual resource module connected to the first SFF. Alternatively, the first SFF forwards, based on a destination address indicated by the selected SID of the second virtual resource module, the packet to a second SFF connected to a selected second virtual resource module.

When the configuration information of the second virtual resource module includes the identifier of each second virtual resource module connected to the first SFF and the identifier of each second virtual resource module connected to the one or more second SFFs, after one SID is selected, the packet needs to be forwarded based on the interface identifier that is of the second virtual resource module and that is indicated by the selected SID or the destination address indicated by the selected SID.

Optionally, in the method, the first SFF further receives SID notification information advertised by each of the one or more second SFFs, where the SID notification information includes an identifier of each second virtual resource module connected to a second SFF that advertises the SID notification information. The first SFF creates, based on the SID notification information advertised by each second SFF, an entry corresponding to each second virtual resource module connected to each second SFF.

In some embodiments of this application, the first SFF may learn of, by using the SID notification information, the identifier of each second virtual resource module connected to each second SFF, to dynamically perform load balancing subsequently.

Optionally, in the method, the first SFF further obtains the identifier of each of the one or more second virtual resource modules connected to the first SFF, and creates, based on the identifier of each of the one or more second virtual resource modules connected to the first SFF, an entry corresponding to each of the one or more second virtual resource modules connected to the first SFF.

When an SFF connected to the second virtual resource module in the communications network includes one or more second SFFs and a first SFF, the first SFF further needs to create an entry based on an identifier of each locally connected second virtual resource module, to implement load balancing in a subsequent packet forwarding process.

Optionally, in the method, the first SFF further advertises SID notification information to each of the one or more second SFFs, where the notification information includes one or more identifiers of the one or more second virtual resource modules connected to the first SFF.

In some embodiments of this application, the first SFF may further advertise SID notification information to each second SFF, so that each second SFF learns of, by using the SID notification information, an identifier of each second virtual resource module connected to the first SFF, and each second SFF dynamically performs load balancing subsequently.

Optionally, the SID notification information is carried in a locator type-length-value TLV, the locator TLV includes a sub-TLV, the sub-TLV includes a SID field, the SID field is used to indicate an identifier of an SFF that advertises the locator TLV, the sub-TLV includes a sub-sub-TLV, the sub-sub-TLV includes a SID field, and the SID field in the sub-sub-TLV is used to indicate an identifier of a second virtual resource module connected to the SFF that advertises the locator TLV.

In some embodiments of this application, the existing locator TLV may be extended, so that the locator TLV can carry the SID notification information, to help promote the service packet forwarding method provided in this application.

According to a second aspect, a service packet forwarding method is provided, and is applied to a first SFF in a communications network. The first SFF is any SFF connected to one or more first virtual resource modules, the communications network further includes one or more second SFFs, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function. In the method, the first SFF receives SID notification information advertised by any one of the one or more second SFFs, where the SID notification information is used to indicate configuration information of a second virtual resource module connected to the any second SFF. The first SFF adds the configuration information of the second virtual resource module connected to the any second SFF to configuration information of the second virtual resource module for implementing the second service function.

In some embodiments of this application, during system initialization, the first SFF and the any one of the one or more second SFFs each may advertise, configuration information of respectively connected virtual resource modules in the communications network by using the SID notification information, so that another SFF can learn of configuration information of a virtual resource module connected to an SFF other than the another SFF, to locally construct configuration information of a virtual resource module for implementing each service function, and therefore subsequently perform dynamic load balancing by using the service packet forwarding method provided in some embodiments of this application.

In addition, after each SFF determines the configuration information of the second virtual resource module, if a second virtual resource module connected to the any second SFF changes, or a second virtual resource module connected to the first SFF changes, the changed virtual resource module may also be notified by using the SID notification information, so that the another SFF updates local configuration information of the second virtual resource module. The foregoing process of updating the configuration information of the second virtual resource module only involves modification of related information of the changed second virtual resource module. In the related technology, when a virtual resource module correspondingly configured for a service function changes, a control node needs to re-orchestrate all segment routing policies. This processing process is for the entire second virtual resource module. It is clear that the process of updating the configuration information of the second virtual resource module in some embodiments of this application is simpler than the process of re-orchestrating all the segment routing policies in the related technology. In addition, in some embodiments of this application, the process of updating the configuration information of the second virtual resource module is much simpler. Therefore, when a virtual resource module correspondingly configured for a service function changes, a packet forwarding procedure in the communications network can be quickly restored to normal, to improve packet forwarding efficiency.

To be specific, in some embodiments of this application, even if the virtual resource module configured for the second service function changes, the first SFF may also dynamically perform load balancing provided that the configuration information of the second virtual resource module is updated in a timely manner, and the control node does not need to re-orchestrate all segment routing policies, to simplify a processing process in this scenario, and improve packet forwarding efficiency in this scenario.

Optionally, the configuration information of the second virtual resource module for implementing the second service function includes a plurality of entries, the plurality of entries include one or more remote entries, and the SID notification information includes an identifier of the any second SFF and a weight of the second virtual resource module connected to the any second SFF. In this case, that the first SFF adds the configuration information of the second virtual resource module connected to the any second SFF to configuration information of the second virtual resource module may comprise the following: The first SFF creates, based on the SID notification information advertised by the any second SFF, a remote entry corresponding to the any second SFF, where the created remote entry includes the identifier of the any second SFF and the weight of the second virtual resource module connected to the any second SFF.

Optionally, the plurality of entries further include one or more local entries. In this case, in the method, the first SFF further obtains an identifier and a weight of each second virtual resource module connected to the first SFF. The first SFF creates, based on the identifier and the weight of each second virtual resource module connected to the first SFF, a local entry corresponding to each second virtual resource module connected to the first SFF, where each created local entry includes an identifier and a weight of a corresponding second virtual resource module.

Optionally, in the method, the first SFF further advertises SID notification information to each of the one or more second SFFs, where the notification information includes a weight of a second virtual resource module connected to the first SFF and an identifier of the first SFF.

Optionally, the SID notification information is carried in a locator type-length-value TLV, the locator TLV includes a sub-TLV, the sub-TLV includes a SID field and a resource weight field, the SID field is used to indicate a weight of an SFF that advertises the locator TLV, and the resource weight field is used to indicate a weight of a first virtual resource module connected to the SFF that advertises the locator TLV.

Optionally, the weight of the second virtual resource module connected to the any second SFF is a quantity of second virtual resource modules connected to the any second SFF, and the weight of each second virtual resource module connected to the first SFF is a quantity 1.

Optionally, the configuration information of the second virtual resource module for implementing the second service function includes an identifier of each second virtual resource module connected to the first SFF and an identifier of each second virtual resource module connected to the one or more second SFFs, and the SID notification information includes an identifier of each of the one or more second virtual resource modules connected to the any second SFF. In this case, that the first SFF adds the configuration information of the second virtual resource module connected to the any second SFF to configuration information of the second virtual resource module may comprise the following: The first SFF creates, based on the SID notification information advertised by the any second SFF, an entry corresponding to each second virtual resource module connected to the any second SFF, where each created entry includes an identifier of a corresponding second virtual resource module.

Optionally, in the method, the first SFF obtains an identifier of each of the one or more second virtual resource modules connected to the first SFF; and creates, based on the identifier of each of the one or more second virtual resource modules connected to the first SFF, an entry corresponding to each of the one or more second virtual resource modules connected to the first SFF, where each created entry includes an identifier of a corresponding second virtual resource module.

Optionally, in the method, the first SFF advertises SID notification information to each of the one or more second SFFs, where the notification information includes an identifier of each of the one or more second virtual resource modules connected to the first SFF.

Optionally, the SID notification information is carried in a locator type-length-value TLV, the locator TLV includes a sub-TLV, a SID field in the sub-TLV is used to indicate a SID of an SFF that advertises the locator TLV, the sub-TLV includes a sub-sub-TLV, and a SID field in the sub-sub-TLV is used to indicate an identifier of a second virtual resource module connected to the SFF that advertises the locator TLV.

Beneficial effects of the service packet forwarding method provided in the second aspect are described in a part related to the SID notification information in the first aspect, and are not described herein again.

According to a third aspect, a service packet forwarding method is provided, and is applied to any one of one or more second SFFs in a communications network. The communications network further includes a first SFF, the first SFF is any SFF connected to one or more first virtual resource modules, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

In the method, the any second SFF receives a packet sent by the first SFF. The any second SFF determines the second service function based on the packet. The any second SFF obtains configuration information of the second virtual resource module for implementing the second service function. The any second SFF forwards, based on the configuration information of the second virtual resource module, the packet to one second virtual resource module connected to the any second SFF.

According to a fourth aspect, a service packet forwarding method is provided, and is applied to a control node in a communications network. The communications network further includes a service function chain ingress node. In the method, the control node determines a segment routing policy, where the segment routing policy is used to indicate a plurality of service functions on a service function chain. The control node delivers the segment routing policy to the service function chain ingress node, so that the service function chain ingress node adds the segment routing policy to a packet header of a received packet.

According to a fifth aspect, a service packet forwarding method is provided, and is applied to a service function chain ingress node in a communications network. The communications network further includes a control node. In the method, the service function chain ingress node receives a segment routing policy delivered by the control node, where the segment routing policy is used to indicate a plurality of service functions on a service function chain. The service function chain ingress node receives a packet, and adds the segment routing policy to a packet header of the packet. The service function chain ingress node obtains configuration information of a first virtual resource module for implementing a first service function, where the first virtual resource module is a virtual resource module for implementing the first service function, and the first service function is a $1^{st}$ service function on the service function chain. The service function chain ingress node forwards, based on the configuration information of the first virtual resource module, the packet to one SFF connected to the first virtual resource module.

According to a sixth aspect, a first SFF in a communications network is provided. The first SFF is any SFF connected to one or more first virtual resource modules, the communications network further includes one or more second SFFs, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

The first SFF includes a memory and a processor.

The memory is configured to store a computer program.

The processor is configured to execute the program stored in the memory to perform the method according to the first aspect, or the method according to the second aspect.

According to a seventh aspect, a second SFF in a communications network is provided. The communications network further includes a first SFF, the first SFF is any SFF connected to one or more first virtual resource modules, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

The second SFF includes a memory and a processor.

The memory is configured to store a computer program.

The processor is configured to execute the program stored in the memory, to perform the method according to the third aspect.

According to an eighth aspect, a control node in a communications network is provided. The control node includes a memory and a processor.

The memory is configured to store a computer program.

The processor is configured to execute the program stored in the memory, to perform the method according to the fourth aspect.

According to a ninth aspect, a service function chain ingress node in a communications network is provided. The service function chain ingress node includes a memory and a processor.

The memory is configured to store a computer program.

The processor is configured to execute the program stored in the memory, to perform the method according to the fifth aspect.

According to a ninth aspect, a chip is provided. The chip is disposed in a first SFF in a communications network, the first SFF is any SFF connected to one or more first virtual resource modules, the communications network further includes one or more second SFFs, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

The chip includes a processor and an interface circuit.

The interface circuit is configured to: receive instructions and transmit the instructions to the processor.

The processor is configured to perform the method according to the first aspect, or the method according to the second aspect.

According to a tenth aspect, a chip is provided. The chip is disposed in a second SFF in a communications network, the communications network further includes a first SFF, the first SFF is any SFF connected to one or more first virtual resource modules, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

The chip includes a processor and an interface circuit.

The interface circuit is configured to: receive instructions and transmit the instructions to the processor.

The processor is configured to perform the method according to the third aspect.

According to an eleventh aspect, a chip is provided. The chip is disposed in a control node in a communications network, and the chip includes a processor and an interface circuit.

The interface circuit is configured to: receive instructions and transmit the instructions to the processor.

The processor is configured to perform the method according to the fourth aspect.

According to a twelfth aspect, a chip is provided. The chip is disposed on a service function chain ingress node in a communications network, and the chip includes a processor and an interface circuit.

The interface circuit is configured to: receive instructions and transmit the instructions to the processor.

The processor is configured to perform the method according to the fifth aspect.

According to a thirteenth aspect, a service packet forwarding system is provided. The system includes a first SFF and one or more second SFFs, the first SFF is any SFF connected to one or more first virtual resource modules, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

Any one of the one or more second SFFs is configured to advertise SID notification information, where the SID notification information is used to indicate configuration information of a second virtual resource module connected to the any second SFF.

The first SFF is configured to: receive the SID notification information, and add the configuration information of the second virtual resource module connected to the any second SFF to configuration information of the second virtual resource module for implementing the second service function.

Optionally, the configuration information of the second virtual resource module for implementing the second service function includes a plurality of entries, the plurality of entries include one or more remote entries, and the SID notification information includes an identifier of the any second SFF and a weight of the second virtual resource module connected to the any second SFF. In this case, the first SFF is configured to create, based on the SID notification information advertised by the any second SFF, a remote entry corresponding to the any second SFF, where the created remote entry includes the identifier of the any second SFF and the weight of the second virtual resource module connected to the any second SFF.

Optionally, the plurality of entries further include one or more local entries. In this case, the first SFF is further configured to: obtain an identifier and a weight of each second virtual resource module connected to the first SFF; and create, based on the identifier and the weight of each second virtual resource module connected to the first SFF, a local entry corresponding to each second virtual resource module connected to the first SFF, where each created local entry includes an identifier and a weight of a corresponding second virtual resource module.

Optionally, the first SFF is further configured to advertise SID notification information to each of the one or more second SFFs, where the notification information includes a weight of a second virtual resource module connected to the first SFF and an identifier of the first SFF.

Optionally, the SID notification information is carried in a locator type-length-value TLV, the locator TLV includes a sub-TLV, the sub-TLV includes a SID field and a resource weight field, the SID field is used to indicate a weight of an SFF that advertises the locator TLV, and the resource weight field is used to indicate a weight of a first virtual resource module connected to the SFF that advertises the locator TLV.

Optionally, the weight of the second virtual resource module connected to the any second SFF is a quantity of second virtual resource modules connected to the any second SFF, and the weight of each second virtual resource module connected to the first SFF is a quantity 1.

Optionally, the configuration information of the second virtual resource module for implementing the second service function includes an identifier of each second virtual resource module connected to the first SFF and an identifier of each second virtual resource module connected to the one or more second SFFs, and the SID notification information includes an identifier of each of the one or more second virtual resource modules connected to the any second SFF. In this case, the first SFF is configured to create, based on the SID notification information advertised by the any second SFF, an entry corresponding to each second virtual resource module connected to the any second SFF, where each created entry includes an identifier of a corresponding second virtual resource module.

Optionally, the first SFF is further configured to: obtain an identifier of each of the one or more second virtual resource modules connected to the first SFF; and create, based on the identifier of each of the one or more second virtual resource modules connected to the first SFF, an entry corresponding to each of the one or more second virtual resource modules connected to the first SFF, where each created entry includes an identifier of a corresponding second virtual resource module.

Optionally, the first SFF is further configured to advertise SID notification information to each of the one or more second SFFs, where the notification information includes an identifier of each of the one or more second virtual resource modules connected to the first SFF.

Optionally, the SID notification information is carried in a locator type-length-value TLV, the locator TLV includes a sub-TLV, a SID field in the sub-TLV is used to indicate a SID of an SFF that advertises the locator TLV, the sub-TLV includes a sub-sub-TLV, and a SID field in the sub-sub-TLV is used to indicate an identifier of a second virtual resource module connected to the SFF that advertises the locator TLV.

According to another aspect, a first SFF in a communications network is further provided. The first SFF is any SFF connected to one or more first virtual resource modules, the communications network further includes one or more second SFFs, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

The first SFF includes:
   a receiving module, configured to receive a packet sent by one first virtual resource module connected to the first SFF;
   a determining module, configured to determine the second service function based on the packet;
   an obtaining module, configured to obtain configuration information of the second virtual resource module for implementing the second service function; and
   a sending module, configured to forward, based on the configuration information of the second virtual resource module, the packet to one second virtual resource module connected to the first SFF or one of the one or more second SFFs.

Optionally, the configuration information of the second virtual resource module includes an identifier and a weight of each second virtual resource module connected to the first SFF, an identifier of each of the one or more second SFFs, and a weight of a second resource module connected to each second SFF.

In this case, the sending module is configured to forward, based on the identifier and the weight of each second virtual resource module connected to the first SFF, the identifier of each of the one or more second SFFs, and the weight of the second resource module connected to each second SFF, the packet to the one second virtual resource module connected to the first SFF or the one of the one or more second SFFs.

Optionally, the configuration information of the second virtual resource module includes an identifier of each of the one or more second SFFs and a weight of a second resource module connected to each second SFF.

In this case, the sending module is configured to forward the packet to the one of the one or more second SFFs based on the weight of the second resource module connected to each second SFF.

Optionally, the configuration information of the second virtual resource module includes a plurality of entries, the plurality of entries include one or more local entries and one or more remote entries, each of the one or more local entries includes an identifier of the one second virtual resource module connected to the first SFF and a weight of the one second virtual resource module connected to the first SFF, and each of the one or more remote entries includes an identifier of one second SFF and a weight of a second virtual resource module connected to the second SFF corresponding to the identifier of the one second SFF.

In this case, the sending module is configured to: determine, based on weights in the plurality of entries by using a hash algorithm, a first entry for forwarding the packet, where the first entry is one of the plurality of entries; and forward, based on the first entry, the packet to the one second virtual resource module connected to the first SFF or the one of the one or more second SFFs.

Optionally, the weight of the one second virtual resource module connected to the first SFF is a quantity 1, and the weight of the second virtual resource module connected to the second SFF corresponding to the identifier of the one second SFF is a quantity of second virtual resource modules connected to the second SFF corresponding to the identifier of the one second SFF; and the hash algorithm satisfies a condition that a ratio between probabilities of matching the packet with entities in the plurality of entries is the same as a ratio between quantities in entries in the plurality of entries.

Optionally, the identifier of the one second virtual resource module connected to the first SFF is an interface identifier of the one second virtual resource module connected to the first SFF, and the identifier of the second SFF is a SID of the second SFF.

In this case, the sending module is configured to: forward, based on the interface identifier that is of the one second virtual resource module connected to the first SFF and that is included in the first entry and through a port indicated by the interface identifier, the packet to the one second virtual resource module connected to the first SFF; or forward, based on the SID that is of the second SFF and that is included in the first entry, the packet to the second SFF indicated by the SID in the first entry.

Optionally, the configuration information of the second virtual resource module includes at least two remote entries, and each of the at least two remote entries includes an identifier of one second SFF and a weight of a second virtual resource module connected to the second SFF corresponding to the identifier of the one second SFF.

In this case, the sending module is configured to: determine, based on weights in the at least two remote entries by using a hash algorithm, a second entry for forwarding the packet, where the second entry is one of the at least two remote entries; and forward, based on the second entry, the packet to the SFF corresponding to the identifier that is of the second SFF and that is in the second entry.

Optionally, the weight of the second virtual resource module connected to the second SFF corresponding to the identifier of the one second SFF is a quantity of second virtual resource modules connected to the second SFF corresponding to the identifier of the one second SFF; and the hash algorithm satisfies a condition that a ratio between probabilities of matching the packet with remote entries in the at least two remote entries is the same as a ratio between quantities in remote entries in the at least two remote entries.

Optionally, the identifier of the one second SFF is a SID of the one second SFF.

Optionally, the receiving module is further configured to receive SID notification information advertised by each of the one or more second SFFs, where the SID notification information includes an identifier of a second SFF that advertises the SID notification information and a weight of a second virtual resource module connected to the second SFF that advertises the SID notification information. In this case, the first SFF further includes a creation module, configured to create, based on the SID notification information advertised by each second SFF, a remote entry corresponding to each second SFF.

Optionally, the obtaining module is further configured to obtain the identifier and the weight of each second virtual resource module connected to the first SFF. In this case, the creation module is further configured to create, based on the identifier and the weight of each second virtual resource module connected to the first SFF, a local entry corresponding to each second virtual resource module.

Optionally, the sending module is further configured to advertise SID notification information to each of the one or more second SFFs, where the SID notification information includes a weight of a second virtual resource module connected to the first SFF and an identifier of the first SFF.

Optionally, the SID notification information is carried in a locator type-length-value TLV, the locator TLV includes a sub-TLV, the sub-TLV includes a SID field and a resource weight field, the SID field is used to indicate an identifier of an SFF that advertises the locator TLV, and the resource weight field is used to indicate a weight of a second virtual resource module connected to the SFF that advertises the locator TLV.

Optionally, the configuration information of the second virtual resource module includes an identifier of each second virtual resource module connected to the first SFF and an identifier of each second virtual resource module connected to the one or more second SFFs.

In this case, the sending module is configured to: select an identifier of one second virtual resource module according to a load balancing policy; and forward, based on the selected identifier of the second virtual resource module, the packet to the one second virtual resource module connected to the first SFF or the one of the one or more second SFFs.

Optionally, the configuration information of the second virtual resource module includes a plurality of entries, and each entry includes an identifier of one second virtual resource module connected to the first SFF or any second SFF.

In this case, the sending module is configured to determine, by using a hash algorithm, a first entry for forwarding the packet, where the first entry includes the selected identifier of the second virtual resource module, the first entry is one of the plurality of entries, and the hash algorithm satisfies a condition that probabilities of matching the packet with entries in the plurality of entries are the same.

Optionally, the identifier of each second virtual resource module is a SID of each second virtual resource module.

In this case, the sending module is configured to: forward, based on an interface identifier that is of the second virtual resource module and that is indicated by the selected SID of the second virtual resource module and through a port indicated by the interface identifier, the packet to the one second virtual resource module connected to the first SFF; or forward, based on a destination address indicated by the selected SID of the second virtual resource module, the packet to a second SFF connected to a selected second virtual resource module.

Optionally, the receiving module is further configured to receive SID notification information advertised by each of the one or more second SFFs, where the SID notification information includes an identifier of each second virtual resource module connected to a second SFF that advertises the SID notification information. In this case, the first SFF further includes a creation module, configured to create, based on the SID notification information advertised by each second SFF, an entry corresponding to each second virtual resource module connected to each second SFF.

Optionally, the obtaining module is further configured to obtain an identifier of each of the one or more second virtual resource modules connected to the first SFF. In this case, the creation module is further configured to create, based on the identifier of each of the one or more second virtual resource modules connected to the first SFF, an entry corresponding to each of the one or more second virtual resource modules connected to the first SFF.

Optionally, the sending module is further configured to advertise SID notification information to each of the one or more second SFFs, where the SID notification information includes one or more identifiers of the one or more second virtual resource modules connected to the first SFF.

Optionally, the SID notification information is carried in a locator type-length-value TLV, the locator TLV includes a sub-TLV, the sub-TLV includes a SID field, the SID field is used to indicate an identifier of an SFF that advertises the locator TLV, the sub-TLV includes a sub-sub-TLV, the sub-sub-TLV includes a SID field, and the SID field in the sub-sub-TLV is used to indicate an identifier of a second virtual resource module connected to the SFF that advertises the locator TLV.

According to another aspect, a first SFF in a communications network is provided. The first SFF is any SFF connected to one or more first virtual resource modules, the communications network further includes one or more second SFFs, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

The first SFF includes:
a receiving module, configured to receive SID notification information advertised by any one of the one or more second SFFs, where the SID notification information is used to indicate configuration information of a second virtual resource module connected to the any second SFF; and
an adding module, configured to add the configuration information of the second virtual resource module connected to the any second SFF to configuration information of the second virtual resource module for implementing the second service function.

Optionally, the configuration information of the second virtual resource module for implementing the second service function includes a plurality of entries, the plurality of entries include one or more remote entries, and the SID notification information includes an identifier of the any second SFF and a weight of the second virtual resource module connected to the any second SFF.

In this case, the adding module is configured to:
create, based on the SID notification information advertised by the any second SFF, a remote entry corresponding to the any second SFF, where the created remote entry includes the identifier of the any second SFF and the weight of the second virtual resource module connected to the any second SFF.

Optionally, the plurality of entries further include one or more local entries. In this case, the first SFF further includes:
an obtaining module, configured to obtain an identifier and a weight of each second virtual resource module connected to the first SFF.

The adding module is further configured to create, based on the identifier and the weight of each second virtual resource module connected to the first SFF, a local entry corresponding to each second virtual resource module connected to the first SFF, where each created local entry includes an identifier and a weight of a corresponding second virtual resource module.

Optionally, the first SFF further includes a sending module, configured to advertise SID notification information to each of the one or more second SFFs, where the SID notification information includes a weight of a second virtual resource module connected to the first SFF and an identifier of the first SFF.

Optionally, the SID notification information is carried in a locator type-length-value TLV, the locator TLV includes a sub-TLV, the sub-TLV includes a SID field and a resource weight field, the SID field is used to indicate a weight of an SFF that advertises the locator TLV, and the resource weight field is used to indicate a weight of a first virtual resource module connected to the SFF that advertises the locator TLV.

Optionally, the weight of the second virtual resource module connected to the any second SFF is a quantity of second virtual resource modules connected to the any second SFF, and the weight of each second virtual resource module connected to the first SFF is a quantity 1.

Optionally, the configuration information of the second virtual resource module for implementing the second service function includes an identifier of each second virtual resource module connected to the first SFF and an identifier of each second virtual resource module connected to the one or more second SFFs, and the SID notification information includes an identifier of each of the one or more second virtual resource modules connected to the any second SFF.

In this case, the adding module is configured to create, by the first SFF based on the SID notification information advertised by the any second SFF, an entry corresponding to each second virtual resource module connected to the any second SFF, where each created entry includes an identifier of a corresponding second virtual resource module.

Optionally, the first SFF further includes:
an obtaining module, configured to obtain an identifier of each of the one or more second virtual resource modules connected to the first SFF.

The adding module is configured to create, based on the identifier of each of the one or more second virtual resource modules connected to the first SFF, an entry corresponding to each of the one or more second virtual resource modules connected to the first SFF, where each created entry includes an identifier of a corresponding second virtual resource module.

Optionally, the first SFF further includes:
a sending module, configured to advertise SID notification information to each of the one or more second SFFs, where the SID notification information includes an identifier of each of the one or more second virtual resource modules connected to the first SFF.

Optionally, the SID notification information is carried in a locator type-length-value TLV, the locator TLV includes a sub-TLV, a SID field in the sub-TLV is used to indicate a SID of an SFF that advertises the locator TLV, the sub-TLV includes a sub-sub-TLV, and a SID field in the sub-sub-TLV is used to indicate an identifier of a second virtual resource module connected to the SFF that advertises the locator TLV.

According to another aspect, any one of one or more second SFFs in a communications network is provided. The communications network further includes a first SFF, the first SFF is any SFF connected to one or more first virtual resource modules, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

The second SFF includes:
a receiving module, configured to receive a packet sent by the first SFF;
a determining module, configured to determine the second service function based on the packet;
an obtaining module, configured to obtain configuration information of the second virtual resource module for implementing the second service function; and
a sending module, configured to forward, based on the configuration information of the second virtual resource module, the packet to one second virtual resource module connected to the any second SFF.

According to another aspect, a control node in a communications network is provided. The communications network further includes a service function chain ingress node.

The control node includes:
a determining module, configured to determine a segment routing policy, where the segment routing policy is used to indicate a plurality of service functions on a service function chain; and
a sending module, configured to deliver the segment routing policy to the service function chain ingress node, so that the service function chain ingress node adds the segment routing policy to a packet header of a received packet.

According to another aspect, a service function chain ingress node in a communications network is provided. The communications network further includes a control node.

The service function chain ingress node includes:
a receiving module, configured to receive a segment routing policy delivered by the control node, where the segment routing policy is used to indicate a plurality of service functions on a service function chain, where the receiving module is further configured to: receive a packet, and add the segment routing policy to a packet header of the packet;
an obtaining module, configured to obtain configuration information of a first virtual resource module for implementing a first service function, where the first virtual resource module is a virtual resource module for implementing the first service function, and the first service function is a $1^{st}$ service function on the service function chain; and
a sending module, configured to forward, based on the configuration information of all the first virtual resource modules, the packet to one SFF connected to the first virtual resource module.

DESCRIPTION OF EMBODIMENTS

To make objectives, technical solutions, and advantages of this application clearer, the following further describes implementations of this application in detail with reference to the accompanying drawings.

It should be understood that "a plurality of" in this specification means two or more. In the descriptions of this application, "/" means "or" unless otherwise specified. For example, A/B may represent A or B. In this specification, "and/or" describes only an association for describing associated objects and represents that three relationships may exist. For example, A and/or B may represent the following three cases: Only A exists, both A and B exist, and only B exists. In addition, to clearly describe the technical solutions in the embodiments of this application, terms such as "first" and "second" are used in the embodiments of this application to distinguish between same items or similar items whose functions and purposes are basically the same. A person skilled in the art may understand that the terms such as "first" and "second" do not limit a quantity or an execution sequence, and the terms such as "first" and "second" do not indicate a definite difference.

Before a service packet forwarding method provided in the embodiments of this application is described, an application scenario in the embodiments of this application is first described.

In a telecommunications cloud service, according to a network security regulation or based on a service requirement, a packet needs to be processed sequentially based on a plurality of SFs. For example, user internet access traffic needs to be processed based on SFs such as Anti-DDoS (a traffic cleaning service), deep packet inspection (DPI), and network (WAN) acceleration. In addition, an SR technology is a routing technology in which a forwarding path is deployed at a network ingress. The SR technology may be applied to an internet protocol version 6 (IPv6) network. In this case, the network may also be referred to as an SRv6 network. An SRv6 header is encapsulated in a packet forwarded in the SRv6 network. The SRv6 header may carry a plurality of SIDs used to identify nodes, to indicate the packet to pass through the nodes along a specified forwarding path. Therefore, the SRv6 technology has inherent advantages in implementing a service function chain function. For an SF that cannot support SRv6, a service function chain proxy, such as an SFF, can be deployed to replace the SF to perform SRv6 data plane processing on a service function chain.

Figure 1:
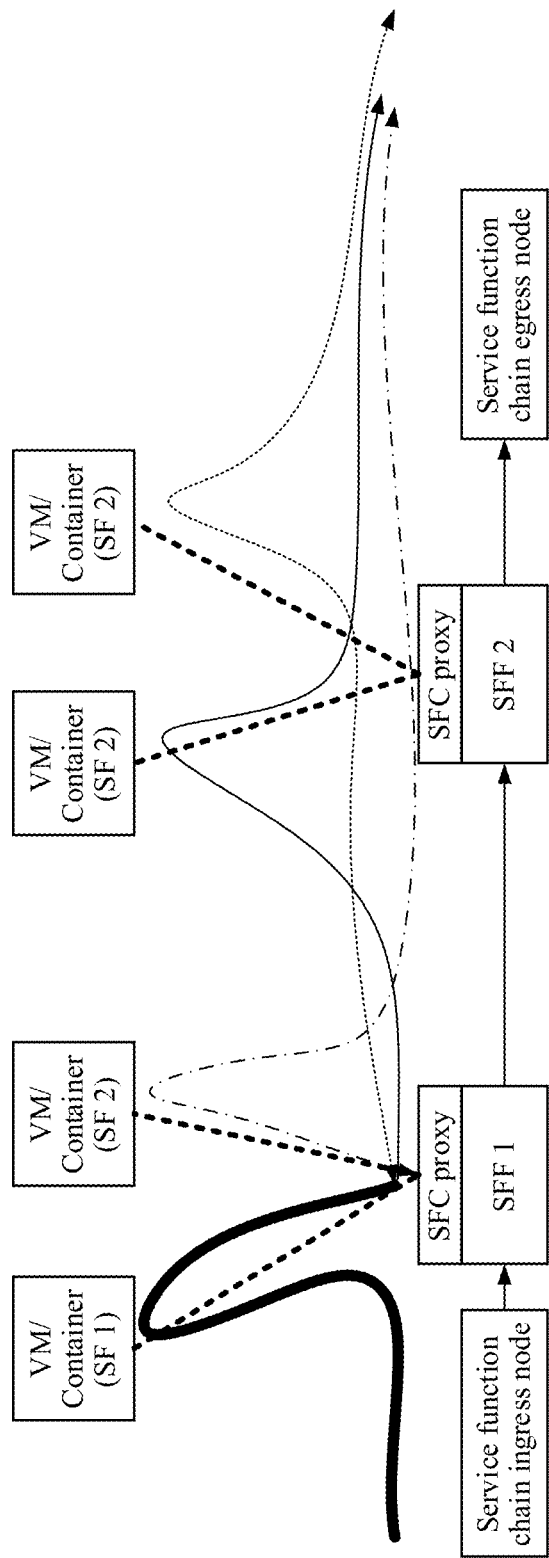
FIG. 1 is a schematic diagram of a packet forwarding procedure according to an embodiment of this application.

In addition, with development of a network function virtualization (NFV) process, an SF in a virtualized network function (VNF) form gradually replaces an SF in a physical network function (physical network function, PNF) form. To obtain a better service capacity and reliability, the SF usually has a scale-out capability. To be specific, a same SF is deployed in a plurality of VMs or containers, and the plurality of VMs or containers each independently implement a function of the SF. Load balancing needs to be performed on traffic among the plurality of VMs/containers, to maximize use of VM/container resources. As shown in FIG. 1, an SF 1 is deployed on one VM/container, and SFs 2 are respectively deployed on three VMs/pods connected to an SFF 1 and an SFF 2. After a packet entering a service function chain (SF 1→SF 2) passes through the SF 1, load balancing is performed on the packet among the three VMs/containers of SF 2.

It should be noted that, for ease of description, the VM/container is referred to as a virtual resource module. In addition, the virtual resource module may alternatively be a resource module in another type of virtual network. Examples are not described one by one herein. The VM/container is a VM or a container.

Figure 2:
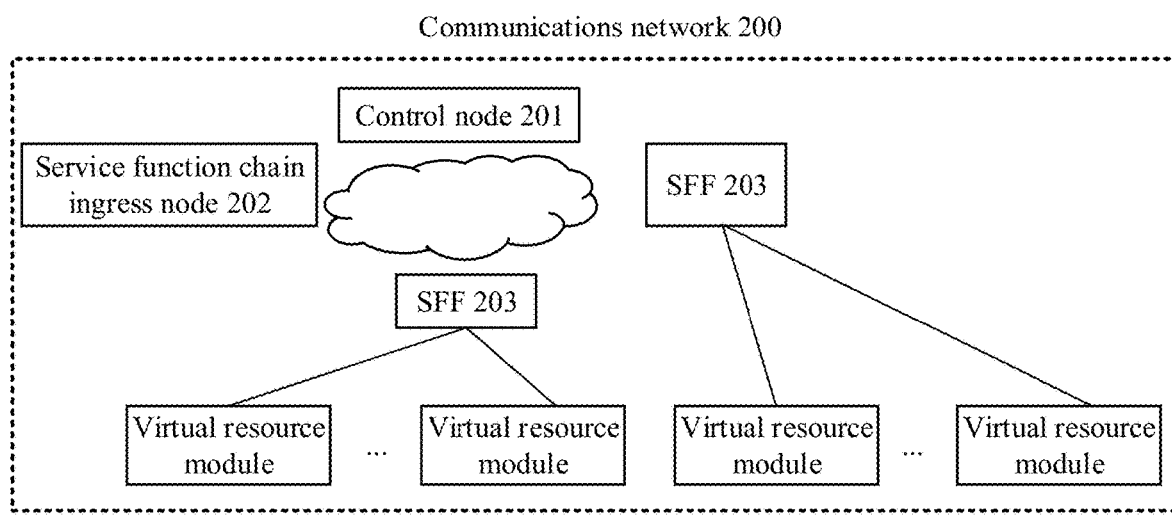
FIG. 2 is a schematic diagram of an architecture of a communications network according to an embodiment of this application.

FIG. 2 is a schematic diagram of an architecture of a communications network according to an embodiment of this application. As shown in FIG. 2, the communications network 200 includes a control node 201, a service function chain ingress node 202, and a plurality of SFFs 203. In FIG. 2, two SFFs 203 are used as an example for description.

The communications network shown in FIG. 2 is a communications network used to implement service functions included in a service function chain. Each service function on the service function chain is implemented by a virtual resource module on one or more SFFs in FIG. 2.

Each SFF 203 is connected to one or more virtual resource modules. The one or more virtual resource modules connected to each SFF may be configured to implement a same service function, or may be configured to implement different service functions. Virtual resource modules connected to different SFFs may be configured to implement a same service function, or may be configured to implement different service functions. In other words, a virtual resource module corresponding to each service function may be a virtual resource module connected to a same SFF, or may be virtual resource modules connected to different SFFs.

The communications network shown in FIG. 1 is a specific implementation of the communications network shown in FIG. 2. In this case, the service function chain includes two service functions: SF 1→SF 2, where the SF 1 is implemented by one virtual resource module on an SFF 1, and the SF 2 is implemented by one virtual resource module on the SFF 1 and two virtual resource modules on an SFF 2. When the service function chain includes more service functions, both a virtual resource module connected to each SFF and a service function implemented by the connected virtual resource module may be configured. Examples are not described one by one herein.

The following uses the communications network shown in FIG. 1 as an example to describe a specific implementation in which each node in the communications network shown in FIG. 2 forwards a service packet.

Figure 3A:
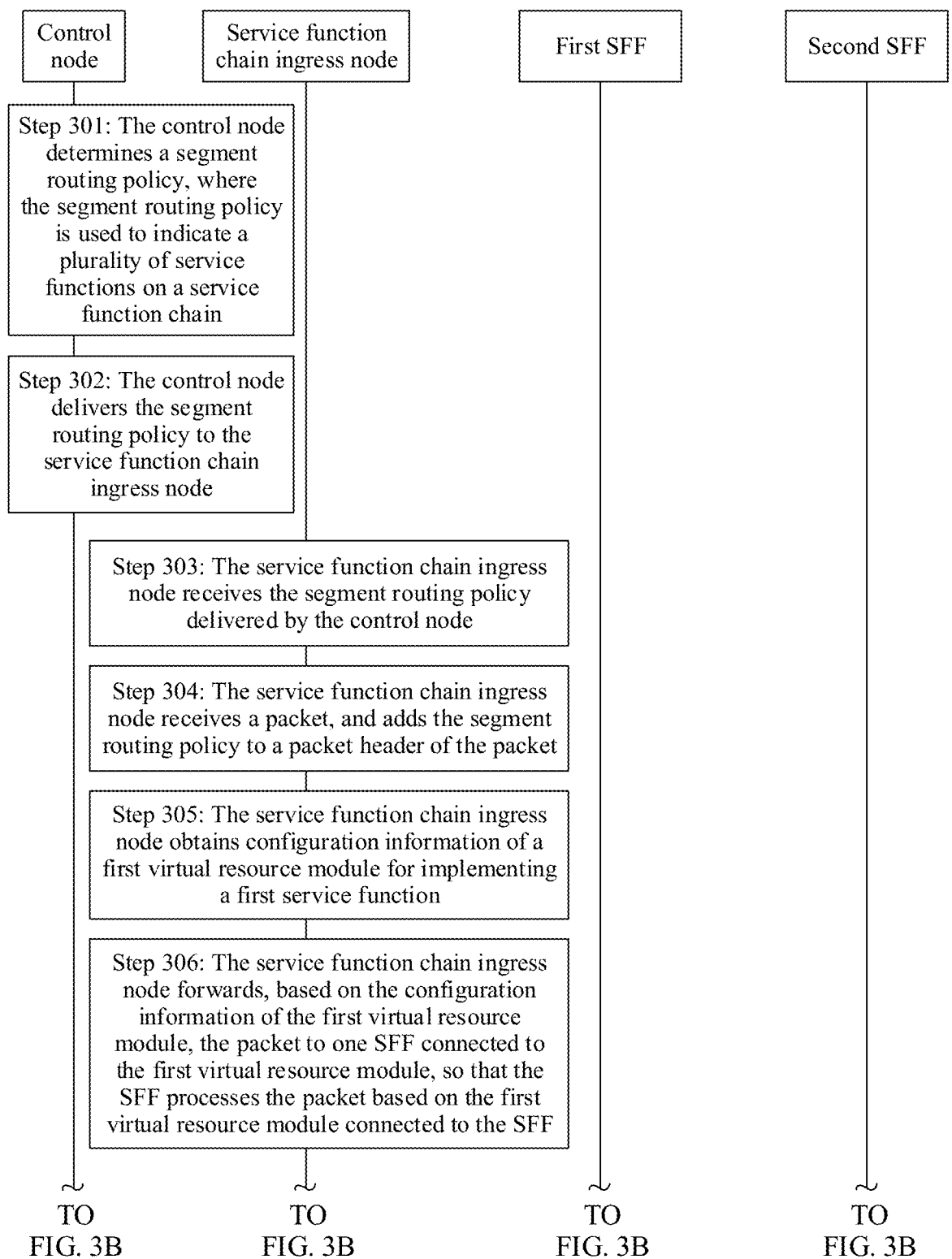
FIG. 3A and FIG. 3B are a flowchart of a service packet forwarding method according to an embodiment of this application.
Figure 3B:
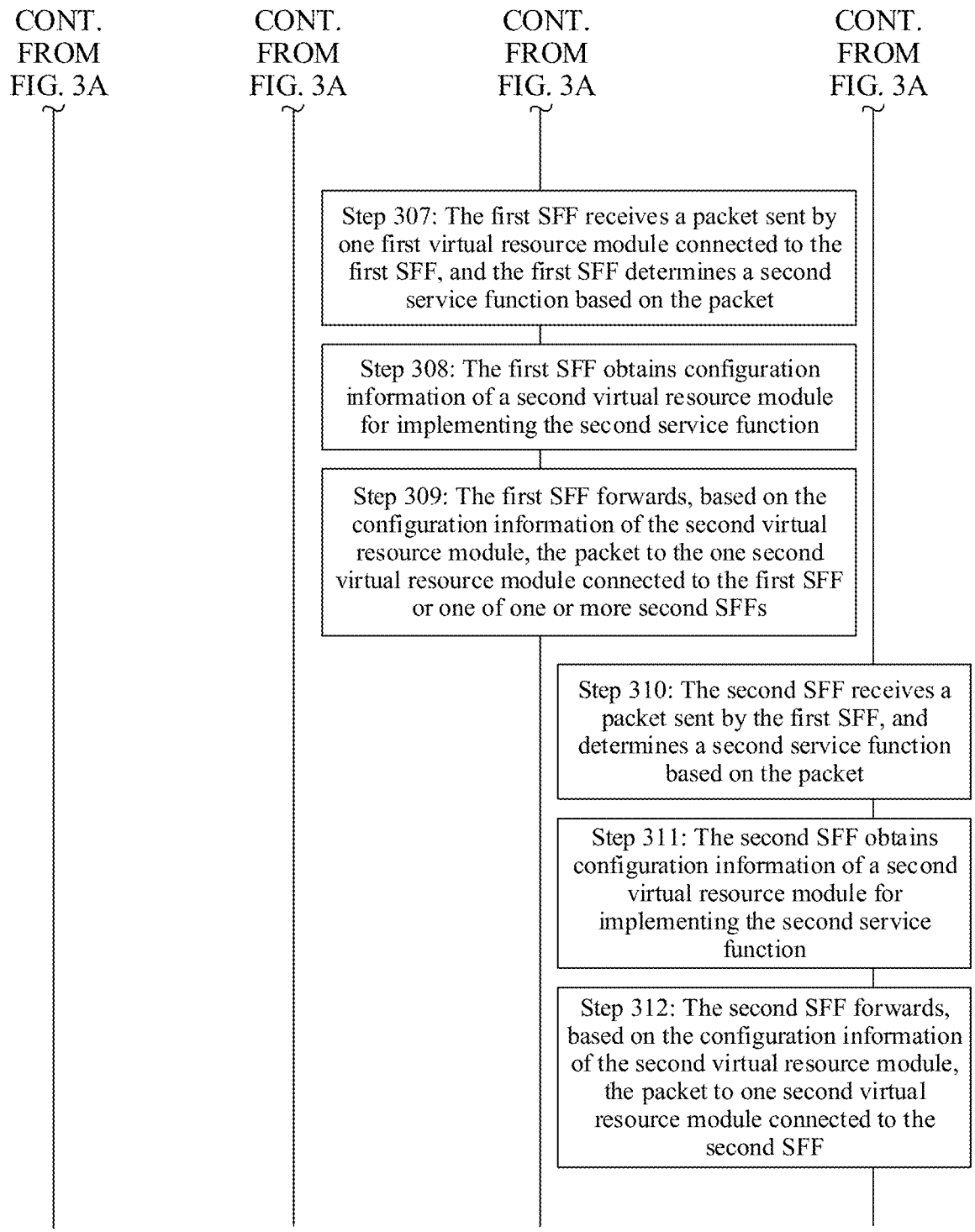

FIG. 3A and FIG. 3B are a flowchart of a service packet forwarding method according to an embodiment of this application. The service packet forwarding method is applied to the communications network shown in FIG. 1 or FIG. 2. As shown in FIG. 3A and FIG. 3B, the method includes the following steps.

Step 301: A control node determines a segment routing policy, where the segment routing policy is used to indicate a plurality of service functions on a service function chain.

In some embodiments of this application, because each SFF may dynamically perform load balancing subsequently, the segment routing policy (SR policy) delivered by the control node only needs to indicate the plurality of service functions on the service function chain, and does not need to indicate a virtual resource module for implementing each service function.

For ease of subsequent description, a first service function is denoted as an SF 1, and a second service function is denoted as an SF 2. For example, it is assumed that the service function chain includes two service functions: SF 1→SF 2. A SID pre-configured by the control node for the SF 1 is A1::1, and a SID pre-configured by the control node for the SF 2 is A2::1. In this case, the segment routing policy is a SID list. The SID list includes A1::1 and A2::1, and A1::1 in the SID list is ranked before A2::1, to indicate that the SF 1 is processed and then the SF 2 is processed.

Step 302: The control node delivers the segment routing policy to a service function chain ingress node.

In a specific implementation, the control node may use a packet to carry the segment routing policy, and then change a destination address of the packet to an address of the service function chain ingress node, to deliver the segment routing policy to the service function chain ingress node. Alternatively, the control node may deliver the segment routing policy to the service function chain ingress node in another manner. Details are not described herein.

Step 303: The service function chain ingress node receives the segment routing policy delivered by the control node.

In step 302 and step 303, the control node delivers the segment routing policy to the service function chain ingress node, so that the service function chain ingress node processes a received packet in step 304 to step 306.

Step 304: The service function chain ingress node receives a packet, and adds the segment routing policy to a packet header of the packet.

Step 305: The service function chain ingress node obtains configuration information of a first virtual resource module for implementing a first service function.

The first service function is a $1^{st}$ service function on the service function chain, the configuration information of the first virtual resource module is used to indicate configuration information of all first virtual resource modules for implementing the first service function on the service function chain in the communications network, and the first virtual resource module is a virtual resource module for implementing the first service function.

The configuration information of the first virtual resource module for implementing the first service function in step 305 is described in detail in the following embodiments, and is not described herein.

Step 306: The service function chain ingress node forwards, based on the configuration information of the first virtual resource module, the packet to one SFF connected to the first virtual resource module, so that the SFF processes the packet based on the first virtual resource module connected to the SFF.

For any one of one or more SFFs connected to the first virtual resource module, if the service function chain ingress node forwards the packet to the SFF, when receiving the packet, the SFF may select, in step 310 to step 312, one first virtual resource module from one or more first virtual resource modules connected to the SFF to process the packet. A difference lies in that in this case, in step 310, the second SFF receives the packet sent by the service function chain ingress node. After the selected first virtual resource module processes the packet, the selected first virtual resource module returns the packet to the SFF, and the SFF may continue to perform next service function processing on the packet in step 307 to step 309.

In step 307 to step 312, how any SFF performs dynamic load balancing on a packet is described by using an example in which the first SFF receives a packet sent by one first virtual resource module connected to the first SFF, that is, by using an example of how to perform dynamic load balancing after the first SFF performs first service function processing on the packet to continue to perform next service function processing on the packet.

Step 307: The first SFF receives a packet sent by one first virtual resource module connected to the first SFF, and the first SFF determines a second service function based on the packet.

In a specific implementation, in a process of forwarding the packet by using an SRv6 technology, the packet carrying the segment routing policy further carries a field used to indicate a currently to-be-processed SID. Therefore, when receiving the packet, the first SFF may determine the currently to-be-processed SID based on the field. Each SID in the segment routing policy indicates a service function. Therefore, the first SFF may determine, based on the received packet, the currently to-be-processed second service function. It should be noted that, in step 307, the first service function may be any service function on the service function chain, and in this case, the second service function is a $1^{st}$ service function ranked after the first service function on the service function chain.

A SID of each service function is pre-advertised by the control node in the communications network. To be specific, the first SFF may store a correspondence between each service function and the SID. For example, the first SFF stores the SID A1::1 corresponding to the SF 1 and the SID A2::1 corresponding to the SF 2. Therefore, when determining, based on the packet, that the to-be-processed SID is A2::1, the first SFF may determine that a currently to-be-processed service function is the second service function SF 2.

Step 308: The first SFF obtains configuration information of a second virtual resource module for implementing the second service function.

The second virtual resource module is a virtual resource module for implementing the second service function. In some embodiments of this application, the configuration information of the second virtual resource module includes configuration information of all second virtual resource modules for implementing the second service function on the service function chain. An SFF connected to the second virtual resource module in the communications network is one or more second SFFs, or one or more second SFFs and a first SFF. Therefore, the configuration information of the second virtual resource module includes configuration information of all second virtual resource modules connected to the first SFF and configuration information of all second virtual resource modules connected to the one or more second SFFs, or configuration information of all second virtual resource modules connected to the one or more second SFFs, so that the first SFF can perform dynamic load balancing on user traffic instead of uniformly performing load balancing by the service function chain ingress node.

Step 309: The first SFF forwards, based on the configuration information of the second virtual resource module, the packet to the one second virtual resource module connected to the first SFF or one of one or more second SFFs.

It should be noted that all the second virtual resource modules that can implement the second service function may be deployed on the first SFF, may be deployed on another second SFF, or may be deployed on both the first SFF and the second SFF. Therefore, the configuration information of the second virtual resource module may include configuration information of a second virtual resource module connected to the first SFF, may include configuration information of a second virtual resource module connected to one or more second SFFs, or may include both configuration information of a second virtual resource module connected to the first SFF and configuration information of a second virtual resource module connected to one or more second SFFs. Regardless of a specific scenario to which the configuration information included in the configuration information of the second virtual resource module belongs, to implement dynamic load balancing, the configuration information of the second virtual resource module includes the configuration information of all the second virtual resource modules for implementing the second service function on the service function chain in the communications network.

Because the configuration information of the second virtual resource module includes the configuration information of all the second virtual resource modules, the first SFF may directly perform offloading on user traffic based on the configuration information of the second virtual resource module, so that the first SFF performs dynamic load balancing. Detailed implementations of step 307 to step 309 are described in the following embodiments, and are not described herein.

Step 310: The second SFF receives a packet sent by the first SFF, and determines a second service function based on the packet.

Step 311: The second SFF obtains configuration information of a second virtual resource module for implementing the second service function.

Step 312: The second SFF forwards, based on the configuration information of the second virtual resource module, the packet to one second virtual resource module connected to the second SFF.

Configuration information of all second virtual resource modules that can implement the second service function on the service function chain is also configured on the second SFF, that is, the configuration information of the second virtual resource module for implementing the second service function. Load balancing is performed on the packet that is sent by the first SFF and that is received by the second SFF. Therefore, in this case, the second SFF only needs to forward the packet to one second virtual resource module connected to the second SFF, and the second virtual resource module performs second service function processing on the packet.

In some embodiments of this application, an SFF connected to the second virtual resource module in the communications network is one or more second SFFs, or one or more second SFFs and a first SFF. Therefore, the configuration information of the second virtual resource module includes at least configuration information of the second virtual resource module connected to the second SFF in the communications network. In this way, when receiving a packet sent by any second virtual resource module connected to the first SFF, the first SFF may dynamically determine a forwarding path of the packet based on the configuration information of the virtual resource module for implementing the second service function, to implement dynamic load balancing on the packet instead of uniformly performing load balancing by a service function chain ingress node, so as to reduce pressure on the service function chain ingress node. In addition, even if the virtual resource module configured for the second service function changes, the first SFF may also dynamically perform load balancing provided that the configuration information of the second virtual resource module is updated in a timely manner, and a control node does not need to re-orchestrate all segment routing policies, to simplify a processing process in this scenario, and improve packet forwarding efficiency in this scenario.

The embodiment shown in FIG. 3A and FIG. 3B is used to describe the complete flowchart of the packet forwarding method provided in some embodiments of this application. In the embodiment shown in FIG. 3A and FIG. 3B, the configuration information of the second virtual resource module includes configuration information of all second virtual resource modules connected to the first SFF and configuration information of all second virtual resource modules connected to the one or more second SFFs. To be specific, the configuration information of the second virtual resource module includes the configuration information of all the second virtual resource modules for implementing the second service function on the service function chain in the communications network. In a specific implementation, a process of generating the configuration information of the second virtual resource module for implementing the second service function on the first SFF may be as follows: The first SFF receives SID notification information advertised by any one of the one or more second SFFs, where the SID notification information is used to indicate configuration information of each second virtual resource module connected to the any second SFF. The first SFF adds the configuration information of each second virtual resource module connected to any second SFF to the configuration information of the second virtual resource module for implementing the second service function.

In addition, this embodiment of this application provides two specific implementations of generating the configuration information of the second virtual resource module. The following separately describes, based on configuration information corresponding to the two different service functions, the service packet forwarding method provided in some embodiments of this application. It should be noted that the following two embodiments are merely used as examples for description, and do not constitute a limitation on the configuration information of the second virtual resource module for implementing the second service function provided in some embodiments of this application. Any implementation that can indicate configuration information of all virtual resource modules for implementing a service function falls within the protection scope of the configuration information of the second virtual resource module for implementing the second service function provided in some embodiments of this application.

In the following embodiments, descriptions are provided by using an example in which the configuration information of the second virtual resource module for implementing the second service function on the first SFF is configured. For configuration information of a virtual resource module for implementing another service function on the first SFF and configuration information of a virtual resource module for implementing any service function on another SFF, refer to the following embodiments. Details are not described in some embodiments of this application.

Figure 4:
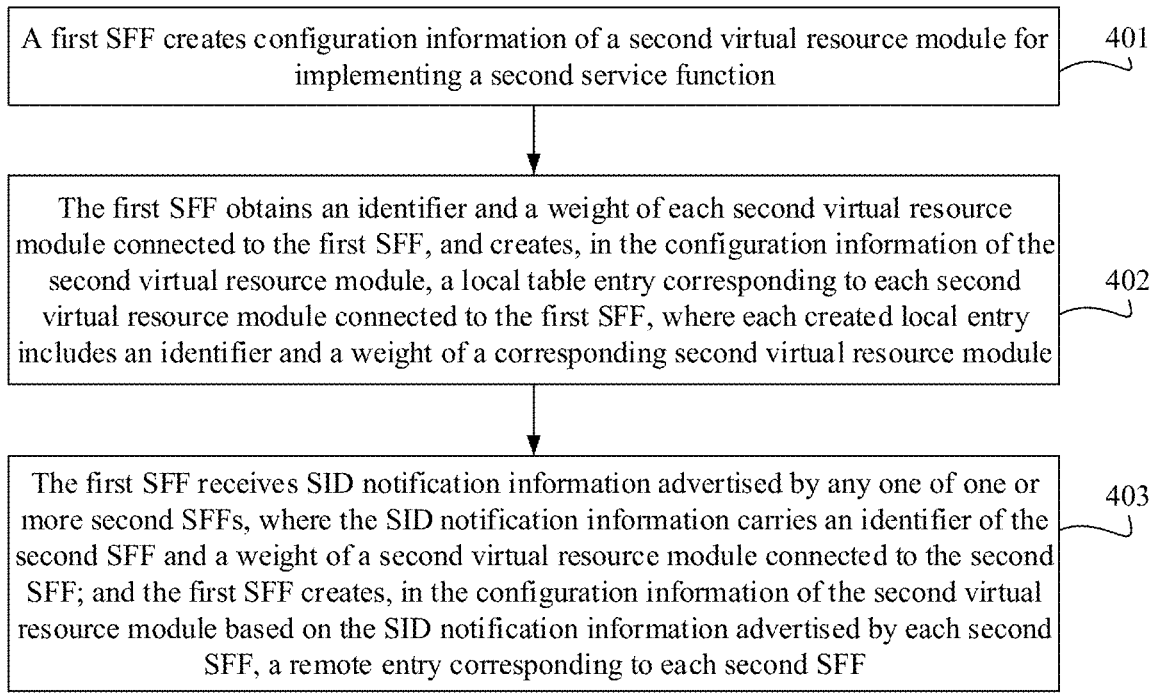
FIG. 4 is a schematic diagram of a process of generating configuration information of a second virtual resource module for implementing a second service function according to an embodiment of this application.

In a first specific implementation, when all the second virtual resource modules for implementing the second service function on the service function chain are deployed on both the first SFF and the one or more second SFFs, the configuration information of the second virtual resource module includes an identifier and a weight of each second virtual resource module connected to the first SFF, an identifier of each of the one or more second SFFs, and a weight of a second resource module connected to each second SFF. Alternatively, when all the second virtual resource modules for implementing the second service function on the service function chain are deployed on the one or more second SFFs, the configuration information of the second virtual resource module includes an identifier of each of the one or more second SFFs and a weight of a second resource module connected to each second SFF. To be specific, in the first specific implementation, the configuration information only needs to indicate a weight of a second virtual resource module connected to another SFF and a weight of each second virtual resource module connected to the first SFF, or a weight of a second virtual resource module connected to another SFF, so that load balancing is subsequently performed based on the weight in the configuration information. The following embodiment shown in FIG. 4 is used to describe the first specific implementation. It should be noted that the embodiment shown in FIG. 4 is merely an optional embodiment of the first specific implementation, and any embodiment that can be used to implement the configuration information in the first specific implementation falls within the protection scope of this application.

Figure 12:
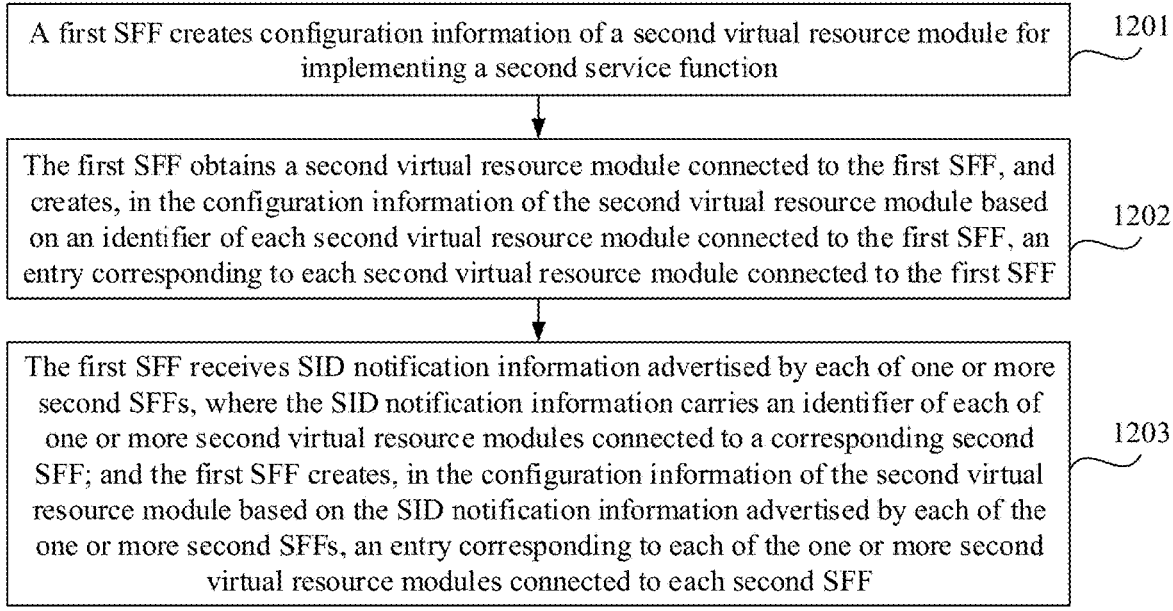
FIG. 12 is a schematic diagram of another process of generating configuration information of a second virtual resource module for implementing a second service function according to an embodiment of this application.

In a second specific implementation, the configuration information of the second virtual resource module for implementing the second service function on the first SFF includes an identifier of each second virtual resource module connected to the first SFF and an identifier of each second virtual resource module connected to the one or more second SFFs, or an identifier of each second virtual resource module connected to the one or more second SFFs. To be specific, in the second specific implementation, the configuration information of the second virtual resource module needs to indicate an identifier of each second virtual resource module in the communications network, so that load balancing is subsequently performed based on the identifier that is of each second virtual resource module and that is in the configuration information. The following embodiment shown in FIG. 12 is used to describe the second specific implementation. It should be noted that the embodiment shown in FIG. 12 is merely an optional embodiment of the second specific implementation, and any embodiment that can be used to implement the configuration information in the second specific implementation falls within the protection scope of this application.

FIG. 4 is a schematic diagram of a process of generating configuration information of a second virtual resource module for implementing a second service function according to an embodiment of this application, and is used to describe the first specific implementation in detail. As shown in FIG. 4, the method includes the following several steps.

Step 401: A first SFF creates configuration information of a second virtual resource module for implementing a second service function.

In the embodiment shown in FIG. 4, the configuration information of the second virtual resource module for implementing the second service function only needs to indicate a weight of a second virtual resource module connected to another SFF and a weight of each second virtual resource module connected to the first SFF, or only needs to indicate a weight of a second virtual resource module connected to another SFF. Therefore, in a specific implementation, the created configuration information of the second virtual resource module for implementing the second service function has the following characteristic: The configuration information of the second virtual resource module includes a local entry and a remote entry. One local entry is used to store an identifier and a weight of one second virtual resource module connected to the first SFF, and one remote entry is used to store a weight of a second virtual resource module connected to any second SFF and an identifier of the second SFF.

The identifier of the one second virtual resource module connected to the first SFF may be an interface identifier of the second virtual resource module, and the weight of the one second virtual resource module connected to the first SFF may be a quantity 1. The weight of the second virtual resource module connected to the any second SFF may be a quantity of second virtual resource modules connected to the second SFF, and the identifier of the second SFF is a SID of the second SFF. In addition, the identifier of the one second virtual resource module connected to the first SFF and the identifier of the any second SFF may also be indicated by other information that can uniquely identify the second virtual resource module or information that can uniquely identify the second SFF. Examples are not described one by one herein. The weight of the second virtual resource module may also be set to another value, provided that the weight of the one second virtual resource module connected to the first SFF can indicate the quantity 1, and the weight of the second virtual resource module connected to the any second SFF can indicate the quantity of second virtual resource modules connected to the second SFF.

The local entry and the remote entry are indicated by an entry type. To be specific, any entry in the configuration information includes an entry type, the entry type includes a first type or a second type, the first type is used to indicate that a corresponding entry is a local entry, and the second type is used to indicate that a corresponding entry is a remote entry.

The configuration information that is of the second virtual resource module and that is created by the first SFF in step 401 is blank configuration information, that is, the configuration information that is of the second virtual resource module and that is created in step 401 merely indicates a specific format of each entry; so that an entry can be subsequently added to the blank configuration information in step 402 and step 403.

Step 402: The first SFF obtains an identifier and a weight of each second virtual resource module connected to the first SFF, and creates, in the configuration information of the second virtual resource module, a local table entry corresponding to each second virtual resource module connected to the first SFF, where each created local entry includes an identifier and a weight of a corresponding second virtual resource module.

Because the first SFF may be locally connected to one or more second virtual resource modules, when the first SFF is locally connected to the one or more second virtual resource modules, the first SFF needs to add, based on an identifier of each locally connected second virtual resource module, a local entry corresponding to each second virtual resource module to the configuration information of the second virtual resource module.

Figure 5:
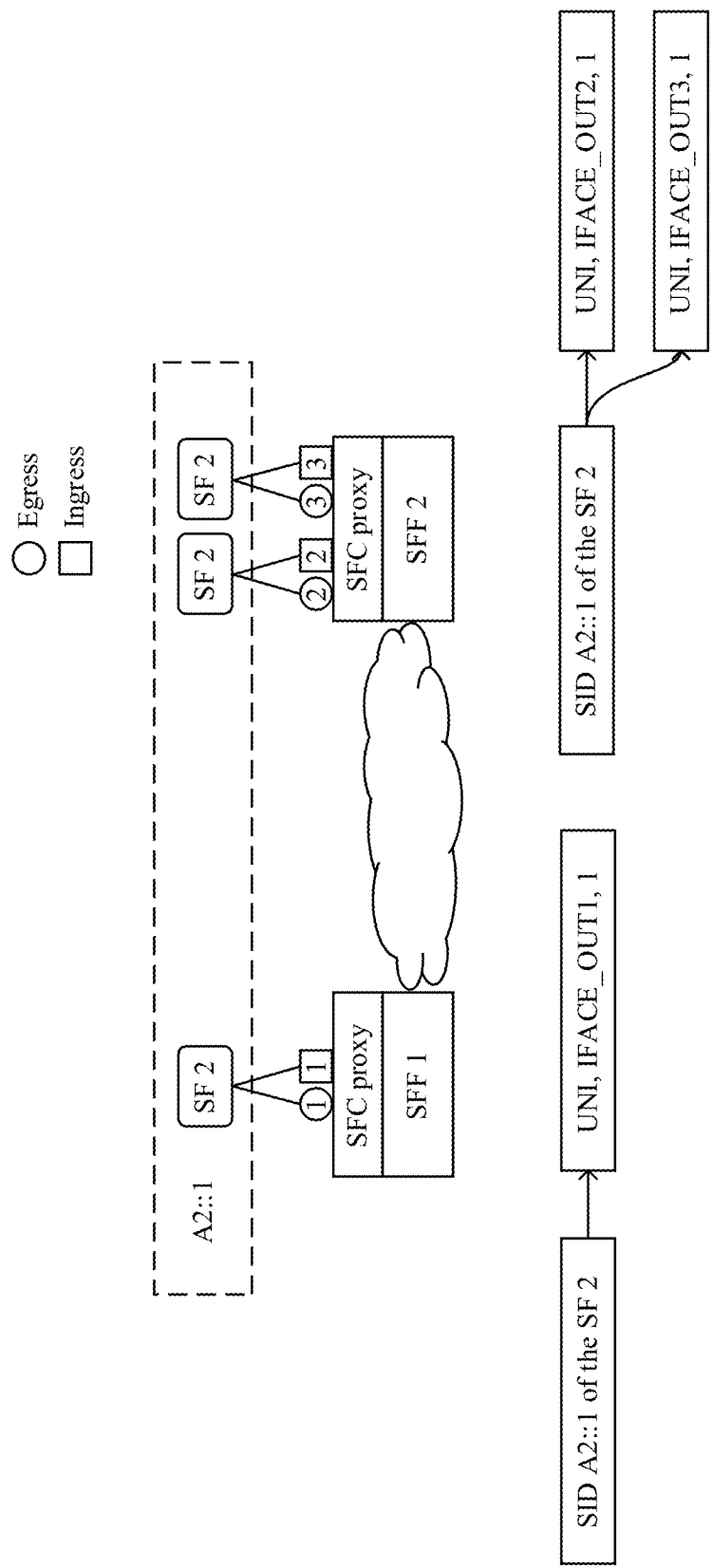
FIG. 5 is a schematic diagram of adding a local entry according to an embodiment of this application.

FIG. 5 is a schematic diagram of adding a local entry according to an embodiment of this application. Descriptions are provided by using an example in which an identifier of each second virtual resource module connected to the first SFF is an interface identifier and a weight of each second virtual resource module connected to the first SFF is a quantity 1. As shown in FIG. 5, the first SFF is denoted as an SFF 1, and the second SFF is denoted as an SFF 2. For the second service function SF 2, the SFF 1 is connected to one second virtual resource module for implementing the SF 2, the SFF 2 is connected to two second virtual resource modules for implementing the SF 2, and a SID of the SF 2 is A2::1.

As shown in FIG. 5, the SFF 1 learns that the SFF 1 is locally connected to one second virtual resource module, and an interface identifier of the second virtual resource module is IFACE_OUT1. Therefore, the SFF 1 may add an entry, that is, UNI, IFACE_OUT1, 1, to configuration information corresponding to A2::1 shown in FIG. 5. UNI in the entry is used to indicate that an entry type is a first type, that is, the entry is a local entry, and 1 is used to indicate that a weight that is of a second virtual resource module and that corresponds to the entry is a quantity 1.

In some embodiments of this application, configuration information corresponding to the second service function may be configured on each node, so that each node can dynamically perform load balancing. Therefore, as shown in FIG. 5, the SFF 2 learns that the SFF 2 is locally connected to two second virtual resource modules, and interface identifiers of the two second virtual resource modules are IFACE_OUT2 and IFACE_OUT3. Therefore, the SFF 2 may add two entries, that is, UNI, IFACE_OUT2, 1 and UNI, IFACE_OUT3, 1, to local configuration information corresponding to A2::1 shown in FIG. 5. UNI in each entry is used to indicate that an entry type is a first type, that is, the entry is a local entry, and 1 is used to indicate that a weight that is of a second virtual resource module and that corresponds to the entry is a quantity 1.

It should be noted that the interface identifier in step 402 is an identifier of an egress from the first SFF to the connected second virtual resource module. The first SFF further includes an ingress from the second virtual resource module to the first SFF. The egress refers to a port on which the first SFF sends a packet to the second virtual resource module, and the ingress refers to a port on which the first SFF receives a packet sent by the second virtual resource module.

Step 403: The first SFF receives SID notification information advertised by any one of one or more second SFFs, where the SID notification information carries an identifier of the second SFF and a weight of a second virtual resource module connected to the second SFF; and the first SFF creates, in the configuration information of the second virtual resource module based on the SID notification information advertised by each second SFF, a remote entry corresponding to each second SFF.

To enable the configuration information to indicate configuration information of all second virtual resource modules, an SFF connected to the second virtual resource module needs to advertise SID notification information in a network, so that another node can learn of related information of all SFFs connected to the second virtual resource modules. Therefore, when another second SFF is connected to the second virtual resource module, the first SFF further needs to add the remote entry to the configuration information of the second virtual resource module in step 403.

Similarly, when the first SFF is connected to the second virtual resource module, the first SFF also needs to advertise SID notification information in the network. An implementation in which the first SFF also needs to advertise the SID notification information in the network may be as follows: The first SFF determines a weight of a locally connected second virtual resource module. The first SFF advertises the SID notification information based on the weight of the locally connected second virtual resource module and an identifier of the first SFF, to indicate another SFF to create, in configuration information that is of the second virtual resource module for implementing the second service function and that is of the other SFF, a remote entry corresponding to the first SFF. The weight of the second virtual resource module connected to the first SFF may be a quantity of second virtual resource modules connected to the first SFF. The identifier of the first SFF may be a SID of the first SFF.

Figures 6, 7:
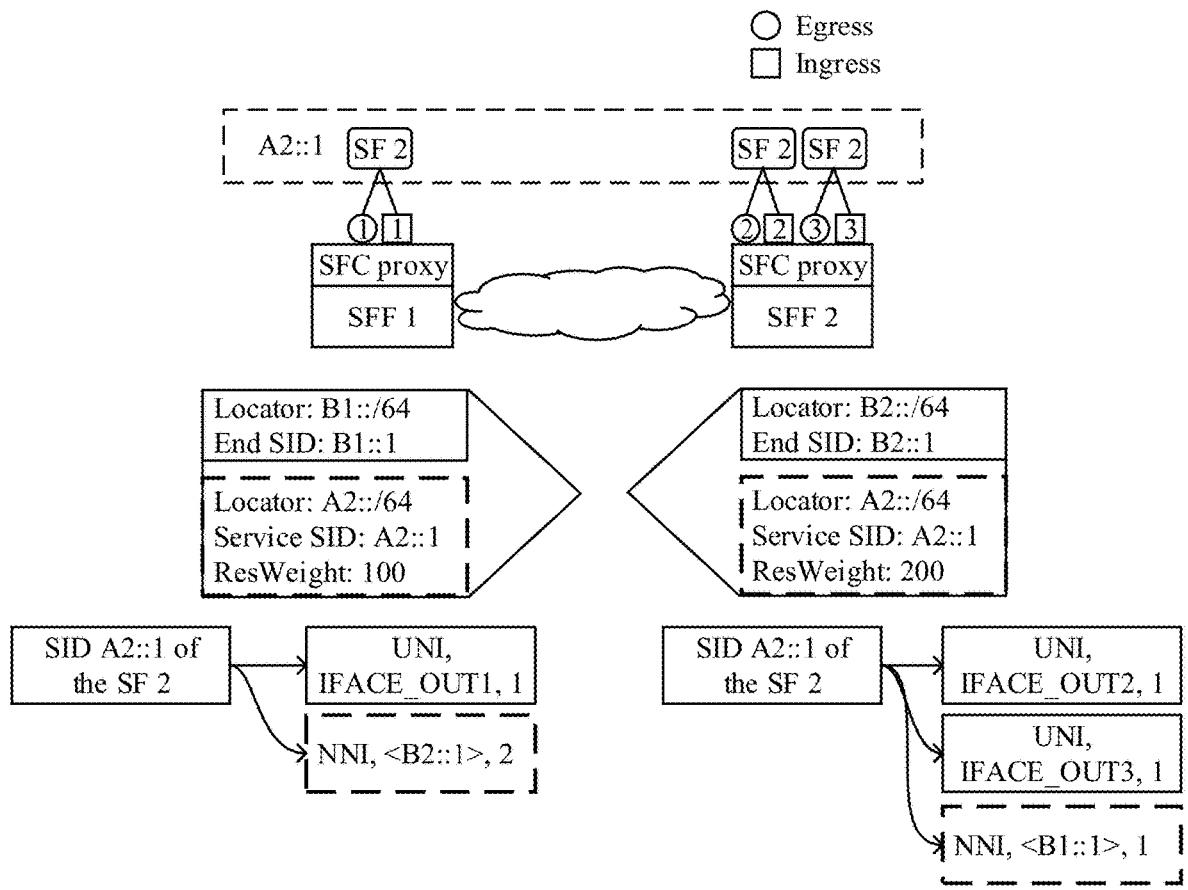
FIG. 6 is a schematic diagram of adding a remote entry according to an embodiment of this application.
FIG. 7 is a schematic diagram of a structure of a sub-TLV according to an embodiment of this application.

FIG. 6 is a schematic diagram of adding a remote entry according to an embodiment of this application. As shown in FIG. 6, an SFF 1 learns, based on SID notification information advertised by an SFF 2, that the SFF 2 is connected to two second virtual resource modules, and a SID of the SFF 2 is B2::1. In this case, the SFF 1 may create a remote entry; that is, NNI, <B2::1>, 2, in local configuration information corresponding to A2::1. NNI in the entry is used to indicate that an entry type is a second type, that is, the entry is a remote entry, and 2 is used to indicate that a quantity that is of second virtual resource modules connected to the SFF 2 and that corresponds to the entry is 2.

Similarly, the SFF 2 learns, based on SID notification information advertised by the SFF 1, that the SFF 1 is connected to one second virtual resource module, and a SID of the SFF 1 is B1::1. In this case, the SFF 1 may add a remote entry, that is, NNI, <B1::1>, 1, in local configuration information corresponding to A2::1. NNI in the entry is used to indicate that an entry type is a second type, that is, the entry is a remote entry, and 1 is used to indicate that a quantity that is of second virtual resource modules connected to the SFF 1 and that corresponds to the entry is 1.

In some embodiments of this application, an existing locator (Locator) TLV may be extended, to advertise the SID notification information by using the locator TLV. To be specific, the SID notification information is carried in the locator TLV, the locator TLV includes a sub-TLV, the sub-TLV includes a SID field and a resource weight field, the SID field is used to indicate a SID of an SFF that advertises the locator TLV, that is, an identifier of the SFF that advertises the locator TLV, and the resource weight field is used to indicate a weight of a second virtual resource module connected to the SFF that advertises the locator TLV. To be specific, in some embodiments of this application, the locator TLV is extended by adding a sub-TLV, and the added sub-TLV is used to indicate the SID notification information. The added sub-TLV may also be denoted as a service SID sub-TLV.

FIG. 7 is a schematic diagram of a structure of a sub-TLV according to an embodiment of this application. As shown in FIG. 7, the sub-TLV includes a type field, a length field, a control flag field, a resource weight field, a SID field, and another optional sub-sub-TLV.

The type field may be a new type. To be specific, a new type is obtained through extension based on an existing type, and is used to indicate the sub-TLV provided in some embodiments of this application. An A bit in the control flag field may be set, and the A bit is set to anycast, to indicate that a SID carried in the sub-TLV is of an anycast type, that is, another SFF may also advertise the sub-TLV of this type. The SID field is used to indicate a SID of an SFF that advertises the locator TLV. The resource weight field is used to indicate a weight of a second virtual resource module connected to the SFF that advertises the locator TLV.

Corresponding to the process of adding the remote entry shown in FIG. 6, the SFF 1 may use a SID list of the locator TLV to carry the SID (A2::1) of the second service function. The SFF 1 may use a SID list of the sub-TLV in the locator TLV to carry the SID (B1::1) of the SFF 1. The SFF 1 may set the resource weight field in the sub-TLV to 100, to indicate that the SFF 1 is connected to one second virtual resource module.

The SFF 2 may use a SID list of the locator TLV to carry the SID (A2::1) of the second service function. The SFF 2 may use a SID list of the sub-TLV in the locator TLV to carry the SID (B1::1) of the SFF 2. The SFF 2 may set the resource weight field in the sub-TLV to 200, to indicate that the SFF 2 is connected to two second virtual resource modules.

Based on the sub-TLV shown in FIG. 7, when each node advertises the locator TLV, another node may obtain a status of a second virtual resource module connected to each node in the network, to add the remote entry to the configuration information.

FIG. 7 is merely an example of extending the sub-TLV in the locator TLV according to some embodiments of this application. When the service packet forwarding method provided in some embodiments of this application is applied, another extension manner may be used, so that the locator TLV can carry the SID notification information. In addition, another TLV may also be used to carry the SID notification information. Examples are not described one by one in this application.

In addition, when all second virtual resource modules corresponding to the second service function are connected to the first SFF, the configuration information that is of the second virtual resource module and that is determined in step 401 to step 403 includes only one or more local entries, each local entry corresponds to one second virtual resource module connected to the first SFF, and each local entry is used to store an interface identifier and a weight of the corresponding second virtual resource module.

When all second virtual resource modules corresponding to the second service function are connected to the second SFF, the configuration information that is of the second virtual resource module and that is determined in step 401 to step 403 includes only one or more remote entries, each remote entry corresponds to one second SFF, and each remote entry further includes a SID of the corresponding second SFF and a weight of a second virtual resource module connected to the corresponding second SFF.

When the second virtual resource module corresponding to the second service function is connected to both the first SFF and the second SFF, the configuration information that is of the second virtual resource module and that is determined in step 401 to step 403 includes one or more local entries and one or more remote entries.

Figures 8, 9:
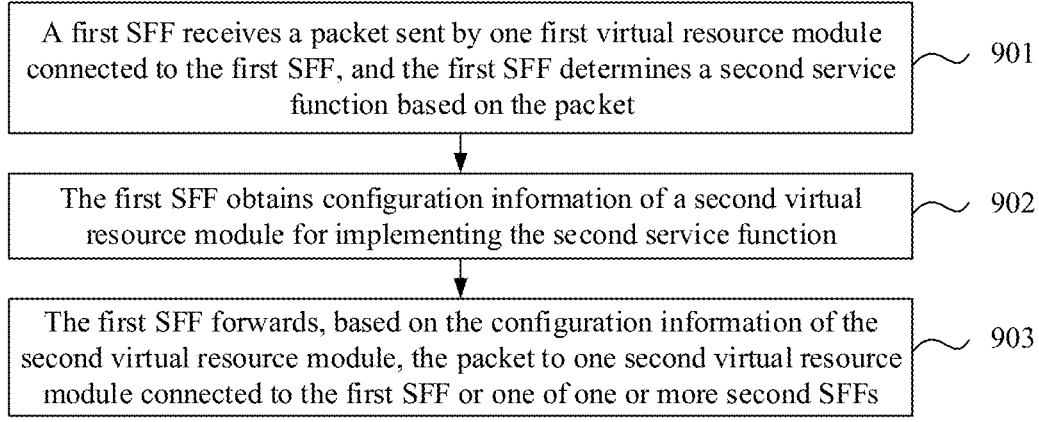
FIG. 8 is a schematic diagram of a structure of a sub-sub-TLV according to an embodiment of this application.
FIG. 9 is a flowchart of another service packet forwarding method according to an embodiment of this application.

In some embodiments of this application, during system initialization, the first SFF and the any one of the one or more second SFFs may advertise configuration information of respectively connected virtual resource modules in the communications network by using the SID notification information in step 401 to step 403, so that another SFF can learn of configuration information of a virtual resource module connected to an SFF other than the another SFF, to locally construct configuration information of a virtual resource module for implementing each service function, and therefore subsequently perform dynamic load balancing in the following embodiment shown in FIG. 9.

In addition, after each SFF determines the configuration information of the second virtual resource module in step 401 to step 403, if a second virtual resource module connected to the any second SFF changes, or a second virtual resource module connected to the first SFF changes, the changed virtual resource module may also be notified in step 401 to step 403, so that the other SFF updates local configuration information of the second virtual resource module. The foregoing process of updating the configuration information of the second virtual resource module only involves modification of related information of the changed second virtual resource module. In the related technology, when a virtual resource module correspondingly configured for a service function changes, a control node needs to re-orchestrate all segment routing policies. This processing process is for the entire second virtual resource module. It is clear that the process of updating the configuration information of the second virtual resource module in some embodiments of this application is simpler than the process of re-orchestrating all the segment routing policies in the related technology. In addition, in some embodiments of this application, the process of updating the configuration information of the second virtual resource module is much simpler. Therefore, when a virtual resource module correspondingly configured for a service function changes, a packet forwarding procedure in the communications network can be quickly restored to normal, to improve packet forwarding efficiency.

Based on the configuration information of the second virtual resource module for implementing the second service function provided in the embodiment shown in FIG. 4, an embodiment of this application further provides a service packet forwarding method. As shown in FIG. 9, the method includes the following steps:

Step 901: A first SFF receives a packet sent by one first virtual resource module connected to the first SFF, and the first SFF determines a second service function based on the packet.

For an implementation of step 901, refer to an implementation of step 307 shown in FIG. 3B. Details are not described herein again.

Step 902: The first SFF obtains configuration information of a second virtual resource module for implementing the second service function.

It can be learned from the embodiment in FIG. 4 that, the first node stores configuration information corresponding to a SID of each service on a service function chain. Therefore, in step 902, when determining that a currently to-be-processed second service function is the SF 2, the SFF 1 may search, based on the SID (A2::1) of the SF 2, the configuration information corresponding to the SID of each service on the service function chain for the configuration information corresponding to A2::1, to obtain the configuration information of the second virtual resource module for implementing the second service function.

The configuration information of the second virtual resource module for implementing the second service function in step 902 is described in detail in the embodiment shown in FIG. 4. Details are not described herein again.

Step 903: The first SFF forwards, based on the configuration information of the second virtual resource module, the packet to one second virtual resource module connected to the first SFF or one of one or more second SFFs.

It can be learned from the embodiment shown in FIG. 4 that the second virtual resource module corresponding to the second service function may be connected to both the first SFF and the second SFF, or may be connected to only the second SFF. For different scenarios, the configuration information of the second virtual resource module for implementing the second service function includes different specific content. Therefore, step 903 is separately described below for the two scenarios.

In Scenario 1, the second virtual resource module is connected to both the first SFF and the one or more second SFFs.

In this case, the configuration information of the second virtual resource module in step 902 includes an identifier and a weight of each second virtual resource module connected to the first SFF, an identifier of each of the one or more second SFFs, and a weight of a second resource module connected to each second SFF. Correspondingly, an implementation of step 903 may be as follows: The first SFF forwards, based on the identifier and the weight of each second virtual resource module connected to the first SFF, the identifier of each of the one or more second SFFs, and the weight of the second resource module connected to each second SFF, the packet to the one second virtual resource module connected to the first SFF or the one of the one or more second SFFs.

Specifically, in Scenario 1, the configuration information of the second virtual resource module may include a plurality of entries, each of the plurality of entries includes one entry type, the entry type includes a first type or a second type, the first type is used to indicate that a corresponding entry is a local entry, and the second type is used to indicate that a corresponding entry is a remote entry. One local entry corresponds to one second virtual resource module connected to the first SFF, and one remote entry corresponds to one second SFF. Each local entry further includes an identifier and a weight of a corresponding second virtual resource module, and each remote entry further includes an identifier of a corresponding second SFF and a weight of a second virtual resource module connected to the corresponding second SFF.

In this case, an implementation of step 903 may be as follows: The first SFF determines, based on weights in the plurality of entries by using a hash algorithm, a first entry for forwarding the packet, where the first entry is one of the plurality of entries. The first SFF forwards, based on the first entry, the packet to the one second virtual resource module connected to the first SFF or the one of the one or more second SFFs.

The weight of the one second virtual resource module connected to the first SFF may be a quantity 1, and the weight of the second virtual resource module connected to the second SFF corresponding to the identifier of the second SFF may be a quantity of second virtual resource modules connected to the second SFF corresponding to the identifier of the second SFF. The hash algorithm satisfies a condition that a ratio between probabilities of matching the packet with entities in the plurality of entries is the same as a ratio between quantities in entries in the plurality of entries. It may be understood that, in another implementation, different hash algorithms may be used, so that a ratio between probabilities of matching the packet with entries in the plurality of entries is different from a ratio between quantities in entries in the plurality of entries. Specifically, a specific type of hash algorithm may be determined according to a load balancing policy.

Specifically, assuming that the identifier of the one second virtual resource module connected to the first SFF is an interface identifier of the one second virtual resource module connected to the first SFF, and the identifier of the second SFF is a SID of the second SFF, an implementation in which the first SFF forwards, based on the first entry, the packet to the one second virtual resource module connected to the first SFF or the one of the one or more second SFFs may be as follows: The first SFF forwards, based on the interface identifier that is of the one second virtual resource module connected to the first SFF and that is included in the first entry and through a port indicated by the interface identifier, the packet to the one second virtual resource module connected to the first SFF. Alternatively, the first SFF forwards, based on the SID that is of the second SFF and that is included in the first entry, the packet to the second SFF indicated by the SID in the first entry.

In Scenario 2, all the second virtual resource modules are connected to the second SFF.

In this case, the configuration information of the second virtual resource module in step 902 includes an identifier of each of the one or more second SFFs and a weight of a second resource module connected to each second SFF. Correspondingly, an implementation of step 903 may be as follows: The first SFF determines, based on weights in at least two remote entries by using a hash algorithm, a second entry for forwarding the packet, where the second entry is one of the at least two remote entries. The first SFF forwards, based on the second entry, the packet to the SFF corresponding to the identifier that is of the second SFF and that is in the second entry.

Specifically, the weight of the second virtual resource module connected to the second SFF corresponding to the identifier of the second SFF may be a quantity of second virtual resource modules connected to the second SFF corresponding to the identifier of the second SFF. In addition, the hash algorithm satisfies a condition that a ratio between probabilities of matching the packet with remote entries in the at least two remote entries is the same as a ratio between quantities in remote entries in the at least two remote entries.

In addition, the identifier of the second SFF is a SID of the second SFF. In this case, that the first SFF forwards, based on the second entry, the packet to the SFF corresponding to the identifier that is of the second SFF and that is in the second entry means that the first SFF forwards, based on the second entry, the packet to the SFF corresponding to the SID that is of the second SFF and that is in the second entry.

For example, for the configuration information that corresponds to the second service function SF 2 and that is on the SFF 1 shown in FIG. 6, after the hash algorithm is performed on the packet, if the determined first entry is an entry in the first row; because a type of the entry is UNI, it indicates that the entry is a local entry, and in this case, a corresponding second virtual resource module is controlled to perform a second service function processing operation on the packet. This process is also referred to as an End.A* operation. If the determined first entry is an entry in the second row; because a type of the entry is NNI, it indicates that the entry is a remote entry, and in this case, the packet is forwarded to a corresponding SFF 2 for second service function processing. This process is also referred to as a T. Insert/Encaps operation. The T. Insert/Encaps operation includes a T. Insert operation, a T. Insert. Red operation, a T.Encaps operation, or a T.Encaps. Red operation. Performing the T. Insert operation, the T. Insert. Red operation, the T.Encaps operation, or the T.Encaps. Red operation can prevent a loop from occurring when traffic is returned to the SFF 1 in a traffic forwarding process. Details are not described herein.

Figure 10:
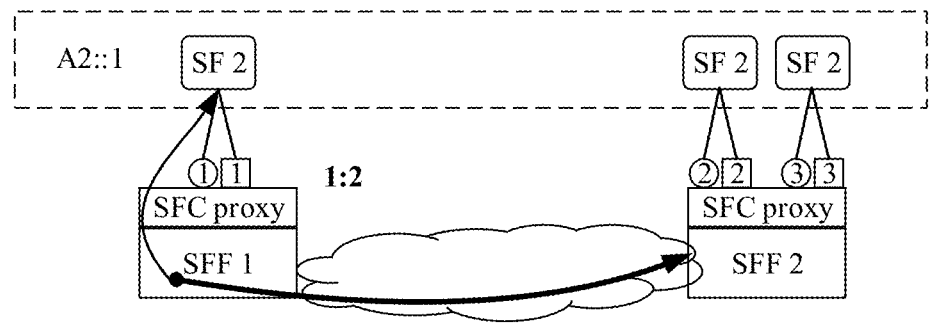
FIG. 10 is a schematic diagram of another service packet forwarding procedure according to an embodiment of this application.

In step 903, dynamic load balancing on user traffic can be implemented. For example, the configuration information that corresponds to the second service function SF 2 and that is deployed on the SFF 1 shown in FIG. 6 includes two entries. As shown in FIG. 10, an entry in the first row is a local entry, and an entry in the second row is a remote entry. It is assumed that user traffic within a period of time is 120M. When the packet is forwarded in step 903, the 120M user traffic is divided into two parts based on a weight, one part is 80M, and the other part is 40M. The 80M user traffic corresponds to the remote entry, and the 40M user traffic corresponds to the local entry. To be specific, as shown in FIG. 10, the user traffic is divided based on the weight of 1:2. User traffic obtained through division based on a weight 1 corresponds to one virtual resource module connected to the SFF 1, and user traffic obtained through division based on a weight 2 corresponds to the remote entry. The first SFF processes user traffic corresponding to any local entry by using the second virtual resource module indicated by the interface identifier included in the local entry. To be specific, the first SFF sends the user traffic corresponding to the local entry through an egress indicated by the interface identifier included in the local entry, so that a second virtual resource module connected to the egress processes the user traffic. As shown in FIG. 10, the SFF 1 sends, based on the configuration information, the user traffic obtained based on the weight 1 to the second virtual resource module connected to the SFF 1.

In addition, the first SFF may forward, based on a SID that is of a second SFF and that corresponds to the remote entry, the user traffic corresponding to the remote entry to the second SFF indicated by the SID of the second SFF. As shown in FIG. 10, the SFF 1 sends the user traffic obtained based on the weight 2 to the SFF 2.

Figure 11:
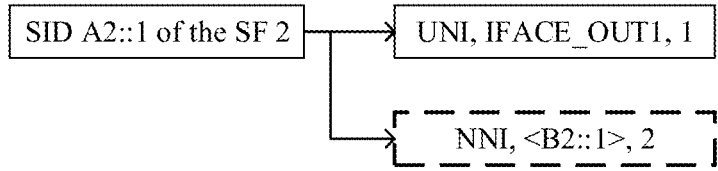
FIG. 11 is a schematic diagram of a process in which a second SFF processes user traffic according to an embodiment of this application.
Figure 11:
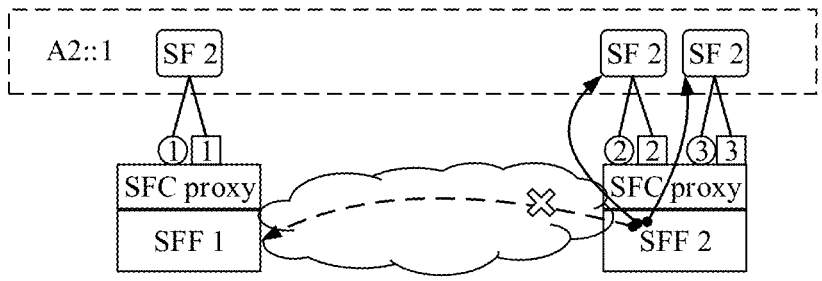
Figure 11:
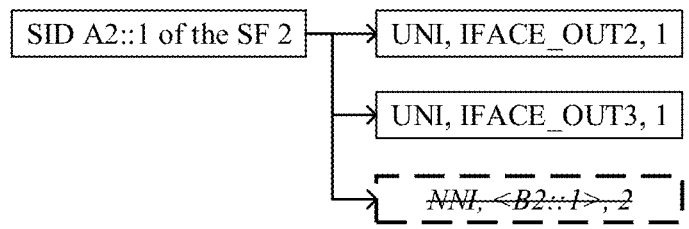

FIG. 11 is a schematic diagram of a process in which a second SFF processes user traffic according to an embodiment of this application. As shown in FIG. 11, when the SFF 2 receives a packet sent by the SFF 1, the SFF 2 may also search, based on the SID, that is, A2::1, of the second service function, for locally stored configuration information of the second virtual resource module for implementing the second service function. Because the SFF 1 has performed offloading on the packet, the SFF 2 only needs to distribute the packet between entries whose entry types are UNI, and does not need to consider an entry whose entry type is NNI in the configuration information. This process may also be referred to as a "split horizon principle". Therefore, the second virtual resource module connected to the SFF 2 performs SF 2 service processing on the packet distributed to the SFF 2.

In some embodiments of this application, an SFF connected to the second virtual resource module in the communications network is one or more second SFFs, or one or more second SFFs and a first SFF. Therefore, the configuration information of the second virtual resource module includes at least configuration information of the second virtual resource module connected to the second SFF in the communications network. In this way, when receiving a packet sent by any second virtual resource module connected to the first SFF, the first SFF may dynamically determine a forwarding path of the packet based on the configuration information of the virtual resource module for implementing the second service function, to implement dynamic load balancing on the packet instead of uniformly performing load balancing by a service function chain ingress node, so as to reduce pressure on the service function chain ingress node. In addition, even if the virtual resource module configured for the second service function changes, the first SFF may also dynamically perform load balancing provided that the configuration information of the second virtual resource module is updated in a timely manner, and a control node does not need to re-orchestrate all segment routing policies, to simplify a processing process in this scenario, and improve packet forwarding efficiency in this scenario.

The following describes the service packet forwarding method based on other configuration information of a second virtual resource module for implementing a second service function provided in an embodiment of this application.

FIG. 12 is a schematic diagram of another process of generating configuration information according to an embodiment of this application, and is used to describe the second specific implementation of the configuration information of the second virtual resource module for implementing the second service function. As shown in FIG. 12, the method includes the following several steps.

Step 1201: A first SFF creates configuration information of a second virtual resource module for implementing a second service function.

In a specific implementation, the created configuration information of the second virtual resource module for implementing the second service function has the following characteristic: The configuration information includes a plurality of entries, and each entry is used to store an identifier of one second virtual resource module connected to the first SFF or any second SFF. Different from the configuration information of the second virtual resource module for implementing the second service function provided in FIG. 4, each entry in the configuration information provided in FIG. 12 corresponds to one second virtual resource module. The second virtual resource module includes all second virtual resource modules that can implement a second service function on a service function chain in a communications network, and may be a second virtual resource module connected to the first SFF, or may be a second virtual resource module connected to another second SFF.

In the configuration information provided in FIG. 12, an entry type may also be set for each entry in the configuration information, that is, each entry includes one entry type. The table type includes a first type or a second type, the first type is used to indicate that a corresponding entry is a local entry, and the second type is used to indicate that a corresponding entry is a remote entry: In this case, the local entry is used to store an identifier of one second virtual resource module connected to the first SFF, and the remote entry is used to store an identifier of one second virtual resource module connected to the second SFF.

In the configuration information of the second virtual resource module for implementing the second service function provided in FIG. 12, regardless of the local entry or the remote entry, the identifier that is of the second virtual resource module and that is in the entry may be a SID of the corresponding second virtual resource module.

The configuration information that is of the second virtual resource module for implementing the second service function and that is created by the first SFF in step 1201 is blank configuration information, that is, the configuration information that is of the second virtual resource module for implementing the second service function and that is created in step 1201 merely indicates a specific format of each entry, so that an entry can be subsequently added to the blank configuration information in step 1202 and step 1203.

Step 1202: The first SFF obtains an identifier of a second virtual resource module connected to the first SFF, and creates, in the configuration information of the second virtual resource module based on the identifier of each second virtual resource module connected to the first SFF, an entry corresponding to each second virtual resource module connected to the first SFF.

One or more virtual resource modules may be locally connected. Therefore, when the first SFF is locally connected to one or more virtual resource modules, the first SFF needs to create an entry in the configuration information based on a SID of each locally connected second virtual resource module. In this case, the created entry may still be denoted as a local entry by using an entry type.

Figure 13:
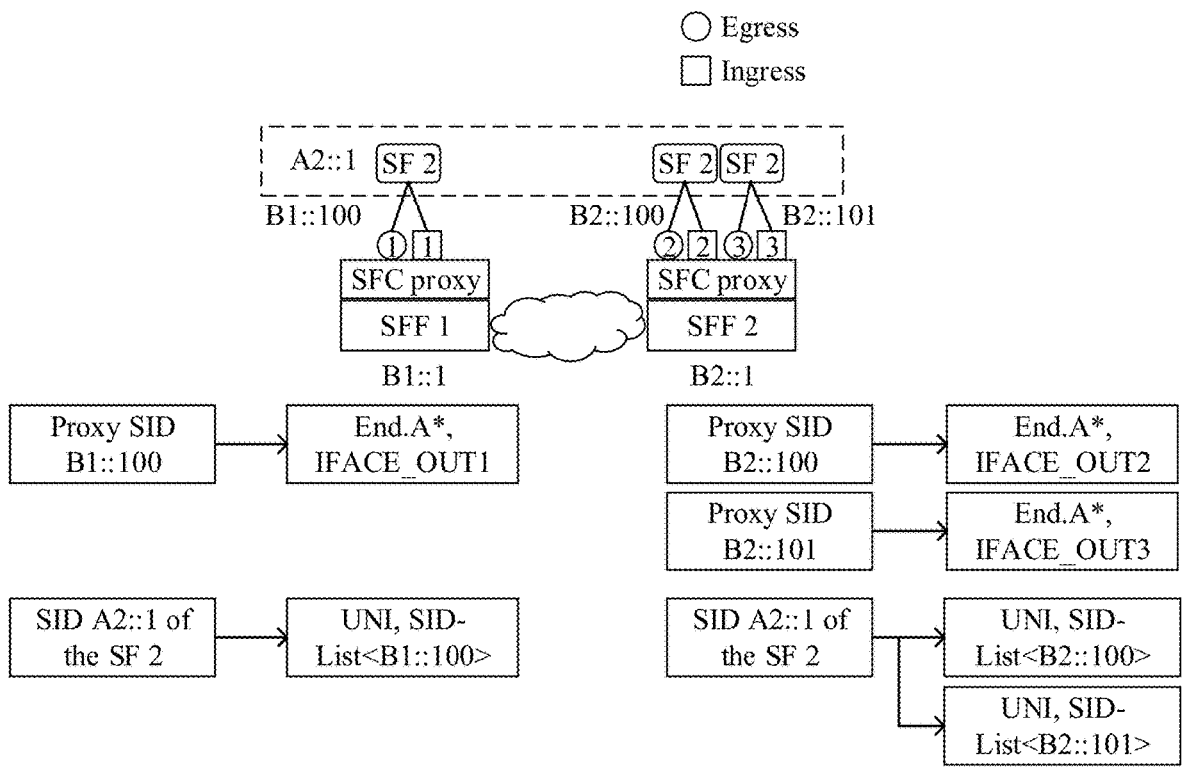
FIG. 13 is a schematic diagram of adding a local entry according to an embodiment of this application.

FIG. 13 is a schematic diagram of adding a local entry according to an embodiment of this application. As shown in FIG. 13, the first SFF is denoted as an SFF 1, and the second SFF is denoted as an SFF 2. For the second service function SF 2, the SFF 1 is connected to one second virtual resource module for implementing the SF 2, the SFF 2 is connected to two second virtual resource modules for implementing the SF 2, and a SID of the SF 2 is A2::1.

As shown in FIG. 13, the SFF 1 may allocate a SID, that is, B1::100, to the second virtual resource module based on related information of the second virtual resource module connected to the SFF 1. The related information includes an egress (IFACE_OUT1) from the SFF 1 to the second virtual resource module, an operation type (End.A*), and the like. For ease of description, the SID allocated to the second virtual resource module in FIG. 13 is referred to as a proxy SID (Proxy SID).

After allocating the SID, that is, B1::100, to the second virtual resource module, the SFF 1 may add an entry to configuration information corresponding to the SID, that is, A2::1, of the SF 2. As shown in FIG. 13, in this case, the added entry is UNI, SID-List<B1::100>. UNI is used to indicate that an entry type of the entry is a first type, that is, the entry is a local entry. SID-List<B1::100> is used to indicate that the SID, that is, B1::100, that is of the second virtual resource module and that is included in the entry is a SID in a SID list.

The configuration information corresponding to the second service function may be configured on each node, so that each node can dynamically perform load balancing. Therefore, as shown in FIG. 13, the SFF 2 may respectively allocate SIDs, that is, B2::100 and B2::101, to the two second virtual resource modules based on related information of the two second virtual resource modules connected to the SFF 2. The related information includes egresses (IFACE_OUT2 and IFACE_OUT3) from the SFF 2 to the second virtual resource modules, an operation type (End.A*), and the like.

After respectively allocating the SIDs, that is, B2::100 and B2::101, to the two second virtual resource modules, the SFF 2 may add two entries to local configuration information corresponding to the SID, that is, A2::1, of the SF 2. As shown in FIG. 13, in this case, one added entry is UNI, SID-List<B2::100>, and the other added entry is UNI, SID-List<B2::101>.

Step 1203: The first SFF receives SID notification information advertised by each of one or more second SFFs, where the SID notification information carries an identifier of each of one or more second virtual resource modules connected to a corresponding second SFF; and the first SFF creates, in the configuration information of the second virtual resource module based on the SID notification information advertised by each of the one or more second SFFs, an entry corresponding to each of the one or more second virtual resource modules connected to each second SFF.

To enable the configuration information of the second virtual resource module for implementing the second service function to indicate configuration information of all second virtual resource modules, an SFF connected to the second virtual resource module needs to advertise SID notification information in a network, so that another node can learn of related information of all SFFs connected to the second virtual resource modules. Therefore, when the other second SFF is connected to the second virtual resource module, the first SFF further needs to create, in the configuration information in step 1203, an entry corresponding to each second virtual resource module connected to the other SFF.

Similarly, when the first SFF is connected to the second virtual resource module, the first SFF also needs to advertise SID notification information in the network. An implementation in which the first SFF also needs to advertise the SID notification information in the network may be as follows: The first SFF advertises the SID notification information based on the obtained identifier of each of the second virtual resource modules, to indicate another SFF to create, in configuration information of the other SFF, an entry corresponding to each second virtual resource module connected to the first SFF. In this case, the created entry may still be denoted as a remote entry by using an entry type.

Figure 14:
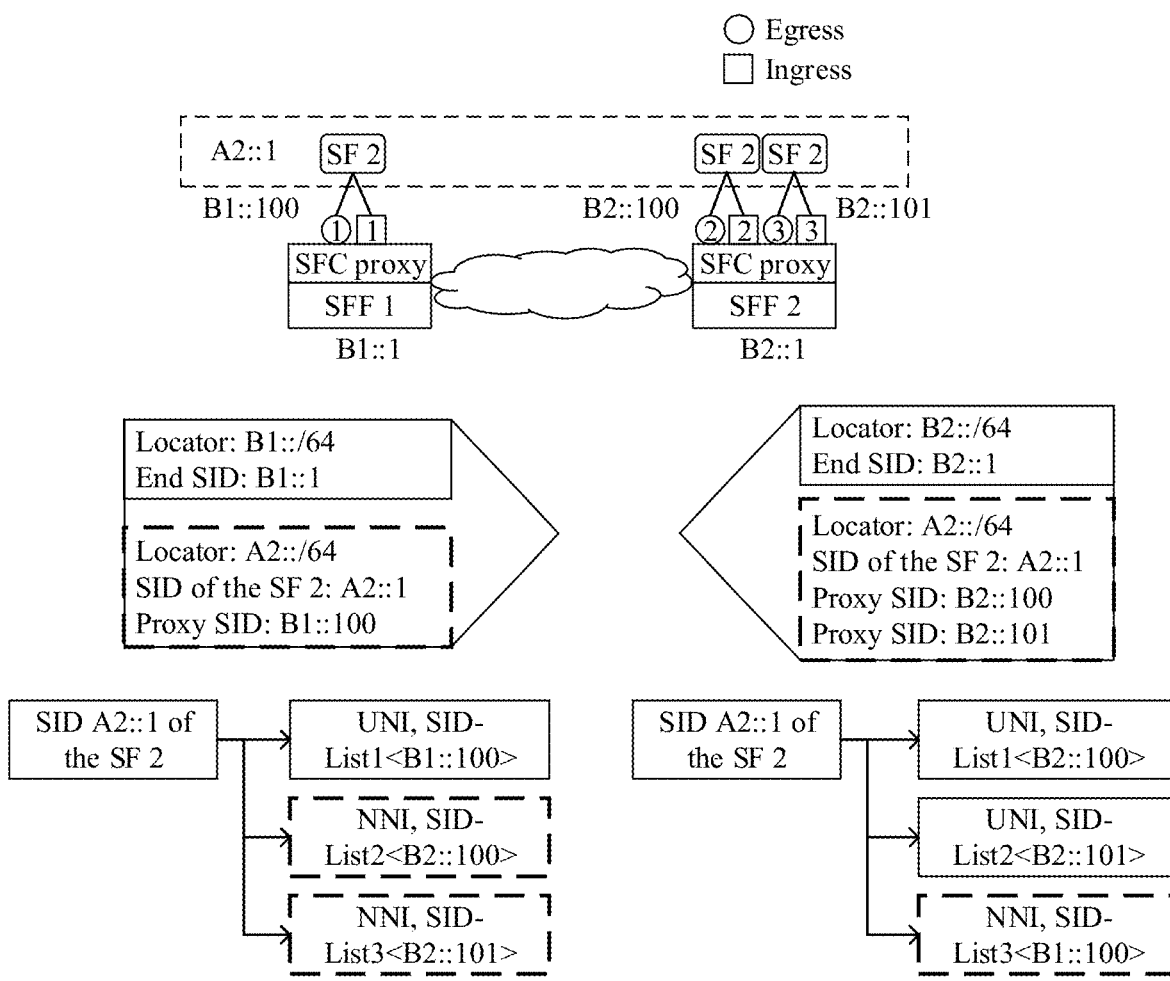
FIG. 14 is a schematic diagram of adding a remote entry according to an embodiment of this application.

FIG. 14 is a schematic diagram of adding a remote entry according to an embodiment of this application. As shown in FIG. 14, the SFF 1 learns, based on SID notification information advertised by the SFF 2, that the SFF 2 is connected to two second virtual resource modules, a SID of the SFF 2 is B2::1, and SIDs allocated by the SFF 2 to the two second virtual resource modules are respectively B2::100 and B2::101. In this case, the SFF 1 may create two remote entries, that is, NNI, SID-List<B2::100> and NNI, SID-List<B2::101>, in local configuration information corresponding to A2::1. NNI in each of the two entries is used to indicate that an entry type is the second type, that is, the entry is a remote entry.

Similarly, the SFF 2 learns, based on SID notification information advertised by the SFF 1, that the SFF 1 is connected to one second virtual resource module, a SID of the SFF 1 is B1::1, and a SID allocated by the SFF 1 to the second virtual resource module is B1::100. In this case, the SFF 1 may create one remote entry, that is, NNI, SID-List<B1::100>, in local configuration information corresponding to A2::1. NNI in the entry is used to indicate that an entry type is a second type, that is, the entry is a remote entry.

Similar to the embodiment shown in FIG. 4, in the embodiment shown in FIG. 12, an existing locator TLV may be extended, to advertise SID notification information by using the locator TLV. To be specific, the SID notification information is carried in the locator TLV, the locator TLV includes a sub-TLV, and a SID field in the sub-TLV is used to indicate a SID of an SFF that advertises the locator TLV, that is, an identifier of the SFF that advertises the locator TLV. A difference lies in that, in the embodiment shown in FIG. 12, the sub-TLV further includes a sub-sub-TLV, and a SID field in the sub-sub-TLV is used to indicate a SID of a second virtual resource module connected to the SFF that advertises the locator TLV. To be specific, in some embodiments of this application, the sub-TLV is newly added to the locator TLV, and the sub-TLV is extended by adding the sub-sub-TLV. The sub-TLV and the sub-sub-TLV are used to indicate the SID notification information. The sub-TLV may also be denoted as a service SID sub-TLV, and the sub-sub-TLV may also be denoted as a service proxy sub-sub-TLV.

Based on the structure of the sub-TLV shown in FIG. 7, FIG. 8 is a schematic diagram of a structure of a sub-sub-TLV according to an embodiment of this application. As shown in FIG. 8, the sub-sub-TLV includes a type field, a length field, a control flag field, and a SID field. The type field may indicate a new type, and the control flag field is used to indicate that the sub-sub-TLV is a sub-sub-TLV provided in some embodiments of this application. The SID field is used to indicate a SID of a second virtual resource module connected to an SFF that advertises a locator TLV.

Corresponding to the process of adding the remote entry shown in FIG. 14, the SFF 1 may use a SID list of the locator TLV to carry the SID, that is, A2::1, of the second service function. The SFF 1 may use a SID list of the sub-TLV in the locator TLV to carry the SID, that is, B1::1, of the SFF 1, and use a SID list of the sub-sub-TLV in the sub-TLV to carry SIDs of second virtual resource modules connected to the SFF 1.

The SFF 2 may use a SID list of the locator TLV to carry the SID, that is, A2::1, of the second service function. The SFF 2 may use a SID list of the sub-TLV in the locator TLV to carry the SID, that is, B1::1, of the SFF 2, and use a SID list of the sub-sub-TLV in the sub-TLV to carry SIDs of second virtual resource modules connected to the SFF 2.

Based on the locator TLV shown in FIG. 7 and FIG. 8, when each node advertises the locator TLV, another node may learn of a SID of a second virtual resource module connected to each node in a network, to add a remote entry to configuration information that is of the second virtual resource module and that is of the other node.

FIG. 8 is merely an example of extending the locator TLV according to some embodiments of this application. When the service packet forwarding method provided in some embodiments of this application is applied, another extension manner may be used, so that the locator TLV can carry the SID notification information. In addition, another TLV may also be used to carry the SID notification information. Examples are not described one by one in this application.

Figure 15:
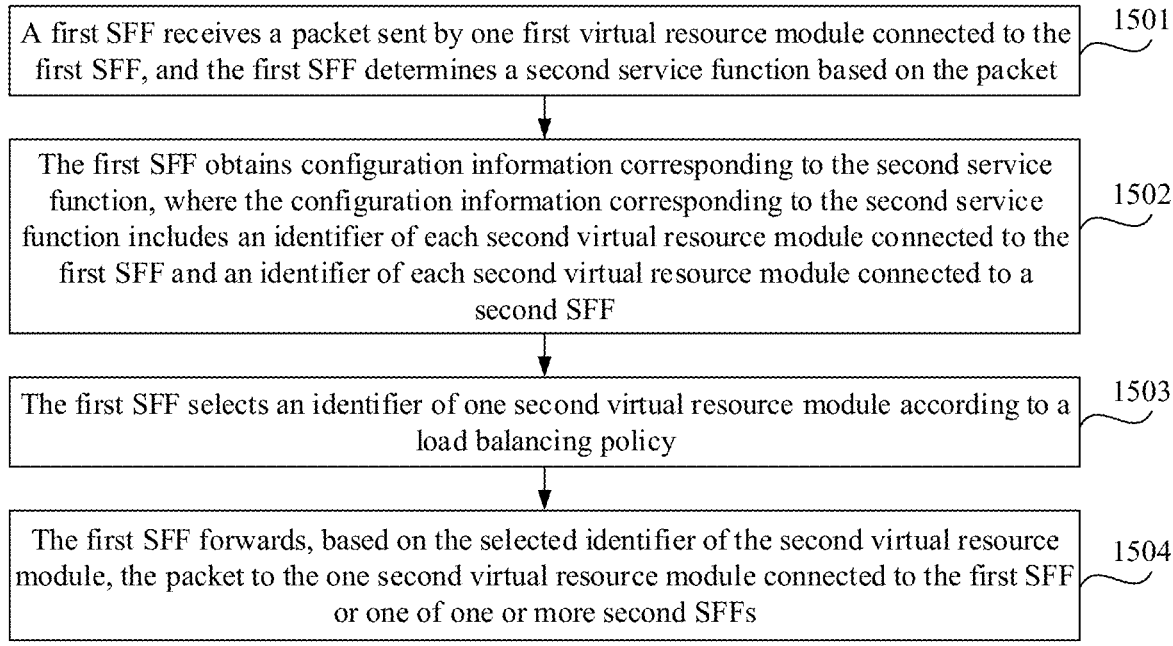
FIG. 15 is a flowchart of still another service packet forwarding method according to an embodiment of this application.

In some embodiments of this application, during system initialization, the first SFF and the any one of the one or more second SFFs may advertise configuration information of respectively connected virtual resource modules in the communications network by using the SID notification information in step 1201 to step 1203, so that another SFF can learn of configuration information of a virtual resource module connected to an SFF other than the another SFF, to locally construct configuration information of a virtual resource module for implementing each service function, and therefore subsequently perform dynamic load balancing in the following embodiment shown in FIG. 15.

In addition, after each SFF determines the configuration information of the second virtual resource module in step 1201 to step 1203, if a second virtual resource module connected to the any second SFF changes, or a second virtual resource module connected to the first SFF changes, the changed virtual resource module may also be notified in step 1201 to step 1203, so that the other SFF updates local configuration information of the second virtual resource module. The foregoing process of updating the configuration information of the second virtual resource module only involves modification of related information of the changed second virtual resource module. In the related technology, when a virtual resource module correspondingly configured for a service function changes, a control node needs to re-orchestrate all segment routing policies. This processing process is for the entire second virtual resource module. It is clear that the process of updating the configuration information of the second virtual resource module in some embodiments of this application is simpler than the process of re-orchestrating all the segment routing policies in the related technology. In addition, in some embodiments of this application, the process of updating the configuration information of the second virtual resource module is much simpler. Therefore, when a virtual resource module correspondingly configured for a service function changes, a packet forwarding procedure in the communications network can be quickly restored to normal, to improve packet forwarding efficiency.

Based on the configuration information provided in the embodiment shown in FIG. 12, an embodiment of this application further provides a service packet forwarding method. As shown in FIG. 15, the method includes the following steps.

Step 1501: A first SFF receives a packet sent by one first virtual resource module connected to the first SFF, and the first SFF determines a second service function based on the packet.

For an implementation of step 1501, refer to an implementation of step 301 shown in FIG. 3A. Details are not described herein again.

Step 1502: The first SFF obtains configuration information of a second virtual resource module for implementing the second service function.

It can be learned from the embodiment in FIG. 12 that, the first node stores configuration information corresponding to a SID of each service on a service function chain. Therefore, in step 1502, when determining that a currently to-be-processed second service function is the SF 2, the SFF 1 may search, based on the SID (A2::1) of the SF 2, the configuration information corresponding to the SID of each service on the service function chain for the configuration information corresponding to A2::1, to obtain the configuration information of the second virtual resource module for implementing the second service function.

In a specific implementation, the configuration information of the second virtual resource module is the configuration information of the second virtual resource module that is provided in the embodiment shown in FIG. 12. To be specific, the configuration information includes a plurality of entries, each entry includes an identifier of one second virtual resource module connected to the first SFF or any second SFF, and the identifier of the second virtual resource module may be a SID of the second virtual resource module. The configuration information of the second virtual resource module is described in detail in the embodiment shown in FIG. 12. Details are not described herein again.

Step 1503: The first SFF selects an identifier of one second virtual resource module according to a load balancing policy.

Based on the configuration information of the second virtual resource module that is generated in the embodiment shown in FIG. 12, an implementation of step 1503 may be as follows: The first SFF determines, by using a hash algorithm, a first entry for forwarding the packet, where the first entry includes the selected identifier of the second virtual resource module, the first entry is one of the plurality of entries, and the hash algorithm satisfies a condition that probabilities of matching the packet with entries in the plurality of entries are the same. It may be understood that, in another implementation, different hash algorithms may be used, so that probabilities of matching the packet with entries in the plurality of entries are different. Specifically, a specific type of hash algorithm may be determined according to a load balancing policy.

Step 1504: The first SFF forwards, based on the selected identifier of the second virtual resource module, the packet to the one second virtual resource module connected to the first SFF or one of one or more second SFFs.

Based on the configuration information generated in the embodiment shown in FIG. 12, an implementation of step 1504 may be as follows: The first SFF forwards, based on an interface identifier that is of the second virtual resource module and that is indicated by the selected SID of the second virtual resource module and through a port indicated by the interface identifier, the packet to the one second virtual resource module connected to the first SFF. Alternatively, the first SFF forwards, based on a destination address indicated by the selected SID of the second virtual resource module, the packet to a second SFF connected to a selected second virtual resource module.

When the first SFF selects the identifier of the one second virtual resource module, it can be learned from the foregoing implementation that the selected second virtual resource module may be a local second virtual module or a remote second virtual resource module, and in different cases, the first SFF forwards the packet in different manners. Therefore, when selecting the identifier of the one second virtual resource module, the first SFF needs to first determine whether the selected second virtual resource module is a local second virtual module or a remote second virtual resource module.

In a possible implementation, the first SFF searches a local SID list for the selected SID, where the local SID list includes a SID of each virtual resource module that is for implementing any service function on a service function chain and that is locally connected to the first SFF. When the first SFF finds the selected SID in the local SID list, it indicates that the selected second virtual resource module may be the local second virtual module. Therefore, the first SFF can obtain the interface identifier that is of the second virtual resource module and that is indicated by the selected SID, to subsequently send, through the port indicated by the obtained interface identifier, the packet to the second virtual resource module indicated by the selected SID.

Correspondingly, when the first SFF does not find the selected SID in the local SID list, it indicates that the selected second virtual resource module is the remote second virtual resource module. Therefore, the first SFF can forward, based on the destination address indicated by the selected SID, the packet to the second SFF connected to the second virtual resource module indicated by the selected SID.

For example, for the configuration information that corresponds to the second service function SF 2 and that is on the SFF 1 shown in FIG. 14, after the hash algorithm is performed on the packet, if the first entry determined after the hash operation is an entry in the first row; because a SID included in the entry in the first row is B1::100, the SID is definitely in the local SID list of the SFF 1, and in this case, a second virtual resource module indicated by B1::100 is controlled to perform a second service function processing operation. This process is also referred to as an End. A* operation. Controlling the second virtual resource module indicated by B1::100 to perform the service processing operation is sending the packet to a corresponding second virtual resource module through an egress (IFACE_OUT1) used when B1::100 is allocated. If the first entry determined after the hash operation is an entry in the second row, because a SID included in the entry in the second row is B2::100, the SID is definitely not in the local SID list of the SFF 1, and in this case, the packet is forwarded to a second virtual resource module that is on a corresponding SFF 2 and that is indicated by B2::100 for second service processing.

If the first entry determined after the hash operation is an entry in the third row, a processing process is the same as the processing process used when the first entry determined after the hash operation is the entry in the second row. For the foregoing processing process, refer to FIG. 16.

Figure 17:
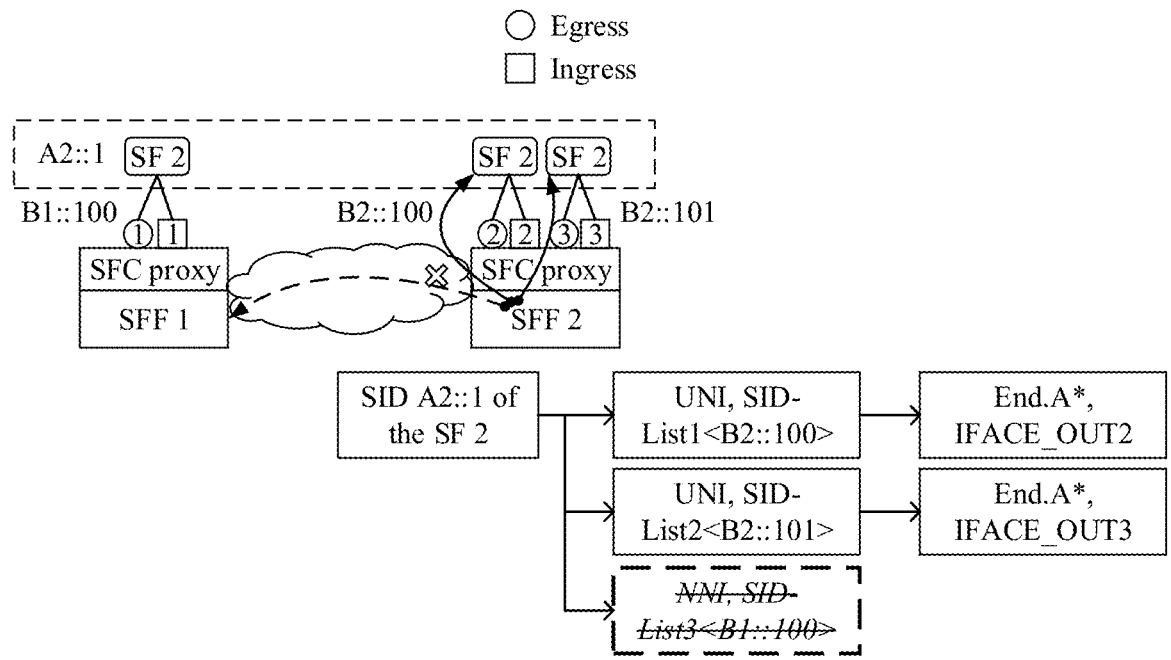
FIG. 17 is a schematic diagram of a process in which a second SFF processes user traffic according to an embodiment of this application.

FIG. 17 is a schematic diagram of a process in which a second SFF processes user traffic according to an embodiment of this application. As shown in FIG. 17, when the SFF 2 receives a packet distributed by the SFF 1, because the packet is user traffic on which the SFF 1 has performed offloading, the SFF 2 only needs to forward the packet to a corresponding second virtual resource module for processing, and does not return the packet to the SFF 1.

Figure 16:
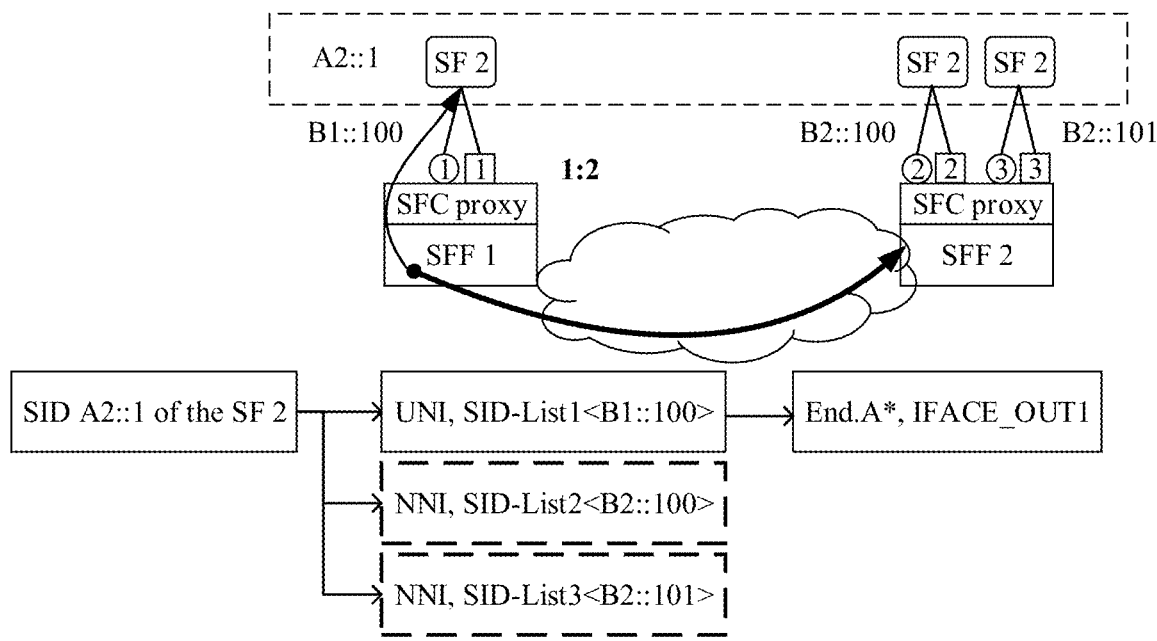
FIG. 16 is a schematic diagram of another service packet forwarding procedure according to an embodiment of this application.

For a packet whose first entry determined after the hash operation is the entry that is in the second row and that is in the configuration information of the second virtual resource module on the SFF 1 in FIG. 16, the SFF 2 searches for an egress identifier corresponding to a SID (that is, a SID included in an entry that is in the first row and that is in the configuration information of the second virtual resource module on the SFF 2 in FIG. 17) included in the entry that is the second row and that is in the configuration information of the second virtual resource module on the SFF 1 in FIG. 16, and sends, based on the egress identifier, the packet to a corresponding second virtual resource module for processing. The processing process is the same as the process in which the SFF 1 processes the packet whose first entry determined after the hash operation is the entry in the first row in FIG. 16. Details are not described herein again.

In some embodiments of this application, an SFF connected to the second virtual resource module in the communications network is one or more second SFFs, or one or more second SFFs and a first SFF. Therefore, the configuration information of the second virtual resource module includes at least configuration information of the second virtual resource module connected to the second SFF in the communications network. In this way, when receiving a packet sent by any second virtual resource module connected to the first SFF, the first SFF may dynamically determine a forwarding path of the packet based on the configuration information of the virtual resource module for implementing the second service function, to implement dynamic load balancing on the packet instead of uniformly performing load balancing by a service function chain ingress node, so as to reduce pressure on the service function chain ingress node. In addition, even if the virtual resource module configured for the second service function changes, the first SFF may also dynamically perform load balancing provided that the configuration information of the second virtual resource module is updated in a timely manner, and a control node does not need to re-orchestrate all segment routing policies, to simplify a processing process in this scenario, and improve packet forwarding efficiency in this scenario.

Figure 18:
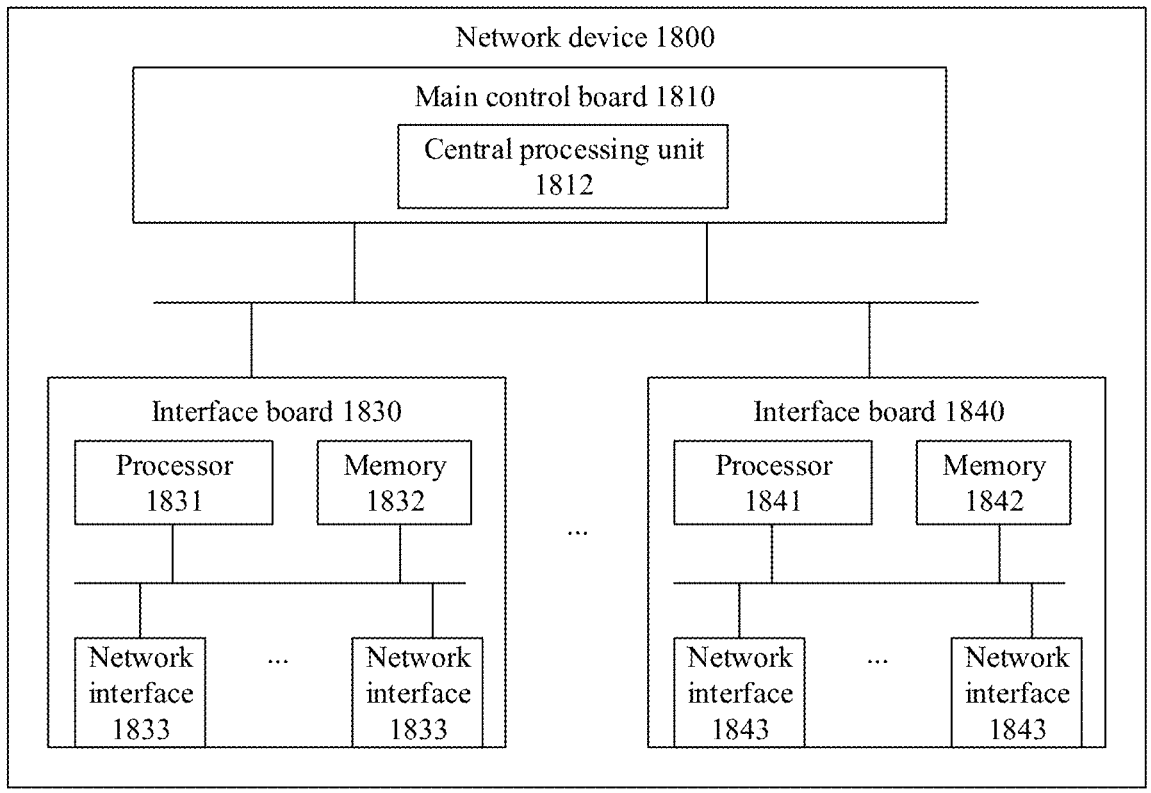
FIG. 18 is a schematic diagram of a structure of a network device according to an embodiment of this application.

FIG. 18 is a schematic diagram of a structure of a network device according to an embodiment of this application. The network device 1800 may be any SFF or service function chain ingress node in the embodiments shown in FIG. 1 to FIG. 15. The network device 1800 may be a switch, a router, or another network device that forwards a packet. In some embodiments, the network device 1800 includes a main control board 1810, an interface board 1830, and an interface board 1840. When there are a plurality of interface boards, a switching board (not shown in the figure) may be included. The switching board is configured to complete data exchange between interface boards (the interface board is also referred to as a line card or a service board).

The main control board 1810 is configured to complete functions such as system management, device maintenance, and protocol processing. The interface boards 1830 and 1840 are configured to: provide various service interfaces (for example, a POS interface, a GE interface, and an ATM interface), and forward a packet. The main control board 1810 mainly includes three types of functional units: a system management and control unit, a system clock unit, and a system maintenance unit. The main control board 1810, the interface board 1830, and the interface board 1840 are connected to a system backboard through a system bus to implement interworking. The interface board 1830 includes one or more processors 1831. The processor 1831 is configured to: control and manage the interface board, communicate with a central processing unit on the main control board, and forward a packet. A memory 1832 on the interface board 1830 is configured to store a forwarding entry, and the processor 1831 forwards a packet by searching the forwarding entry stored in the memory 1832.

The interface board 1830 includes one or more network interfaces 1833, configured to: receive a packet sent by another device, and send the packet according to an indication of the processor 1831. For a specific implementation process, refer to steps 303, 304, 306, 307, 309, 310, and 312 in the embodiment shown in FIG. 3A and FIG. 3B, step 403 in the embodiment shown in FIG. 4, steps 901 and 903 in the embodiment shown in FIG. 9, step 1203 in the embodiment shown in FIG. 12, and steps 1501 and 1504 in the embodiment shown in FIG. 15. Details are not described herein again.

The processor 1831 is configured to perform processing steps and functions of any SFF or service function chain ingress node in the embodiments shown in FIG. 3A and FIG. 3B to FIG. 15. For details, refer to step 305 (processing performed when the processor 1831 is used as a service function chain ingress node), step 308 (processing performed when the processor 1831 is used as a first SFF), or step 311 (processing performed when the processor 1831 is used as a second SFF) in the embodiment shown in FIG. 3A and FIG. 3B, steps 401 and 402 in the embodiment shown in FIG. 4, step 902 in the embodiment shown in FIG. 9, steps 1201 and 1202 in the embodiment shown in FIG. 12, and steps 1502 and 1503 in the embodiment shown in FIG. 15. Details are not described herein again.

It may be understood that, as shown in FIG. 18, some embodiments may include a plurality of interface boards, and uses a distributed forwarding mechanism. In this mechanism, operations on the interface board 1840 are basically similar to operations on the interface board 1830. For brevity, details are not described again. In addition, it may be understood that the processor 1831 and/or the processor 1841 on the interface board 1830 in FIG. 18 may be dedicated hardware or a chip, for example, a network processor or an application-specific integrated circuit (application-specific integrated circuit), to implement the foregoing functions. This implementation is usually referred to as a manner of using dedicated hardware or a chip for processing on a forwarding plane. For a specific implementation of using the dedicated hardware or the chip such as the network processor, refer to the embodiment shown in FIG. 19. In another implementation, the processor 1831 and/or the processor 1841 may alternatively be a general-purpose processor, for example, a general-purpose CPU, to implement the foregoing functions.

In addition, it should be noted that there may be one or more main control boards, and when there are a plurality of main control boards, the main control boards may include an active main control board and a standby main control board. There may be one or more interface boards, and a device having a stronger data processing capability provides more interface boards. If there are a plurality of interface boards, the plurality of interface boards can communicate with each other by using one or more switching boards, and the plurality of interface boards can jointly implement load balancing and redundancy backup. In a centralized forwarding architecture, the device may not need the switching board, and the interface board provides a function of processing service data of an entire system. In a distributed forwarding architecture, the device includes a plurality of interface boards. Data exchange between the plurality of interface boards may be implemented by using a switching board, and the plurality of interface boards can provide a large-capacity data exchange and processing capability. Therefore, a data access and processing capability of the network device in the distributed architecture is better than that of the device in the centralized architecture. A specific architecture that is to be used depends on a specific networking deployment scenario. This is not limited herein.

In a specific embodiment, the memory 1832 may be a read-only memory (read-only memory, ROM) or another type of static storage device that can store static information and instructions, or a random access memory (RAM) or another type of dynamic storage device that can store information and instructions. The memory 1832 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk or another magnetic storage device, or any other medium that can be used to carry or store expected program code in a form of an instruction or a data structure and that can be accessed by a computer. However, the memory 1832 is not limited thereto. The memory 1832 may exist independently, and is connected to the processor 1831 through a communications bus. Alternatively, the memory 1832 may be integrated into the processor 1831.

The memory 1832 is configured to store program code, and execution is controlled by the processor 1831, to perform the path detection method provided in the foregoing embodiment. The processor 1831 is configured to execute the program code stored in the memory 1832. The program code may include one or more software modules. The one or more software modules may be software modules provided in either of the following embodiments in FIG. 21 and FIG. 22.

In a specific embodiment, the network interface 1833 may be any apparatus such as a transceiver, and is configured to communicate with another device or a communications network, for example, the Ethernet, a radio access network (radio access network, RAN), or a wireless local area network (wireless local area network, WLAN).

Figure 19:
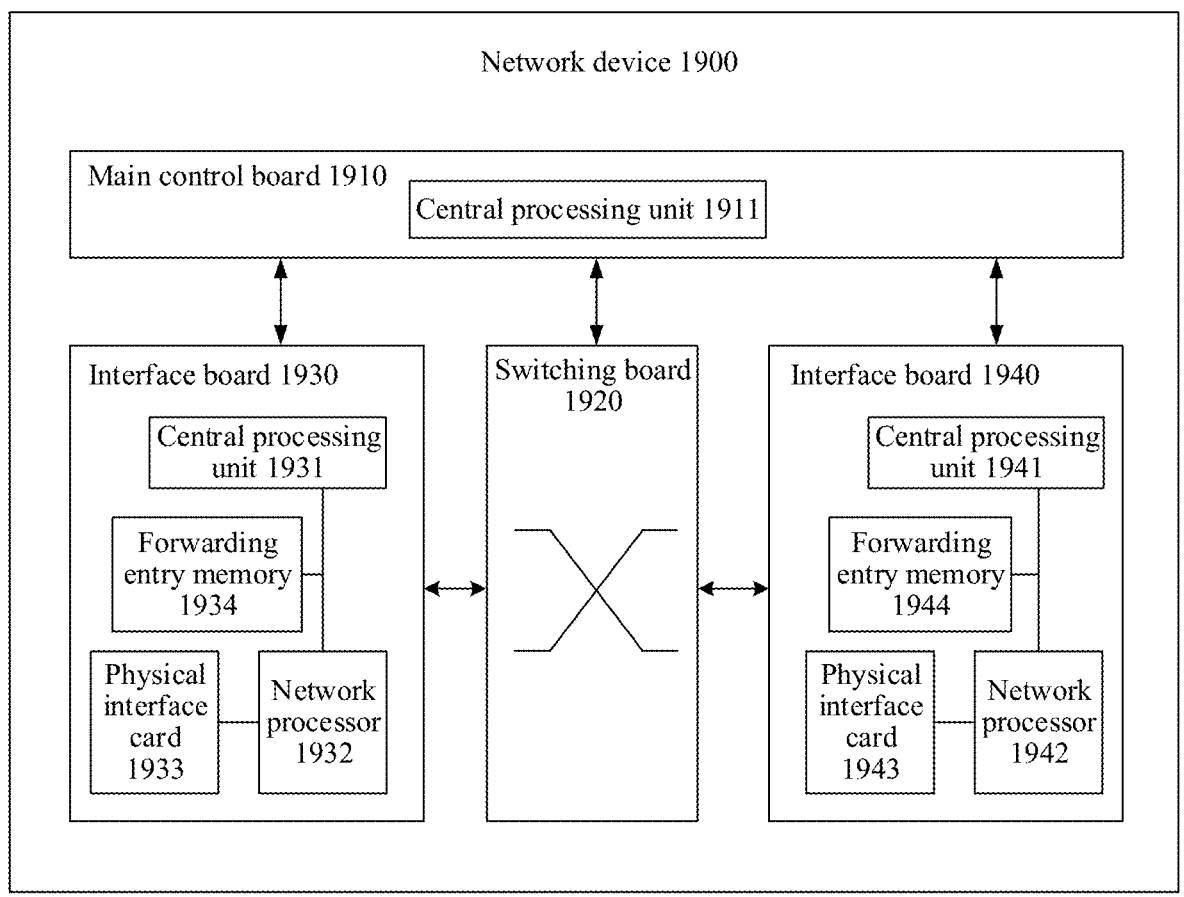
FIG. 19 is a schematic diagram of a structure of another network device according to an embodiment of this application.

FIG. 19 is a schematic diagram of a structure of another network device according to an embodiment of this application. The network device 1900 may be any SFF or service function chain ingress node in the embodiments shown in FIG. 1 to FIG. 15. The network device 1900 may be a switch, a router, or another network device that forwards a packet. In some embodiments, the network device 1900 includes a main control board 1910, an interface board 1930, a switching board 1920, and an interface board 1940. The main control board 1910 is configured to complete functions such as system management, device maintenance, and protocol processing. The switching board 1920 is configured to complete data exchange between interface boards (the interface board is also referred to as a line card or a service board). The interface boards 1930 and 1940 are configured to: provide various service interfaces (for example, a POS interface, a GE interface, and an ATM interface), and forward a data packet. A control plane includes management and control units on the main control board 1910 and management and control units on the interface boards 1930 and 1940. The main control board 1910 mainly includes three types of functional units: a system management and control unit, a system clock unit, and a system maintenance unit. The main control board 1910, the interface boards 1930 and 1940, and the switching board 1920 are connected to a system backboard through a system bus to implement interworking. A central processing unit 1931 on the interface board 1930 is configured to: control and manage the interface board, and communicate with a central processing unit on the main control board. A forwarding entry memory 1934 on the interface board 1930 is configured to store a forwarding entry, and a network processor 1932 forwards a packet by searching the forwarding entry stored in the forwarding entry memory 1934.

A physical interface card 1933 on the interface board 1930 is configured to receive a packet. For a specific implementation process, refer to steps 303, 304, 307, and 310 in the embodiment shown in FIG. 3A and FIG. 3B, step 403 in the embodiment shown in FIG. 4, step 901 in the embodiment shown in FIG. 9, step 1203 in the embodiment shown in FIG. 12, and step 1501 in the embodiment shown in FIG. 15. Details are not described herein again.

The network processor 1932 is configured to perform processing steps and functions of any SFF or service function chain ingress node in the embodiments shown in FIGS. 3A and 3B to FIG. 15. For details, refer to step 305 (processing performed when the network processor 1932 is used as a service function chain ingress node), step 308 (processing performed when the network processor 1932 is used as a first SFF), or step 311 (processing performed when the network processor 1932 is used as a second SFF) in the embodiment shown in FIG. 3A and FIG. 3B, steps 401 and 402 in the embodiment shown in FIG. 4, step 902 in the embodiment shown in FIG. 9, steps 1201 and 1202 in the embodiment shown in FIG. 12, and steps 1502 and 1503 in the embodiment shown in FIG. 15. Details are not described herein again.

Then, after processing, a packet is sent to another device by using the physical interface card 1933. For a specific implementation process, refer to steps 306, 309, and 312 in the embodiment shown in FIG. 3A and FIG. 3B, step 903 in the embodiment shown in FIG. 9, and step 1504 in the embodiment shown in FIG. 15. Details are not described herein again.

It may be understood that, as shown in FIG. 19, some embodiments may include a plurality of interface boards, and uses a distributed forwarding mechanism. In this mechanism, operations on the interface board 1940 are basically similar to operations on the interface board 1930. For brevity, details are not described again. In addition, as described above, functions of the network processor 1932 and the network processor 1942 in FIG. 19 may be replaced with those of an application-specific integrated circuit (ASIC).

In addition, it should be noted that there may be one or more main control boards, and when there are a plurality of main control boards, the main control boards may include an active main control board and a standby main control board. There may be one or more interface boards, and a device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the device may not need the switching board, and the interface board provides a function of processing service data of an entire system. In a distributed forwarding architecture, the device may include at least one switching board. Data exchange between a plurality of interface boards is implemented by using the switching board, to provide a large-capacity data exchange and processing capability. Therefore, a data access and processing capability of the network device in the distributed architecture is better than that of the device in the centralized architecture. A specific architecture that is to be used depends on a specific networking deployment scenario. This is not limited herein.

Figure 20:
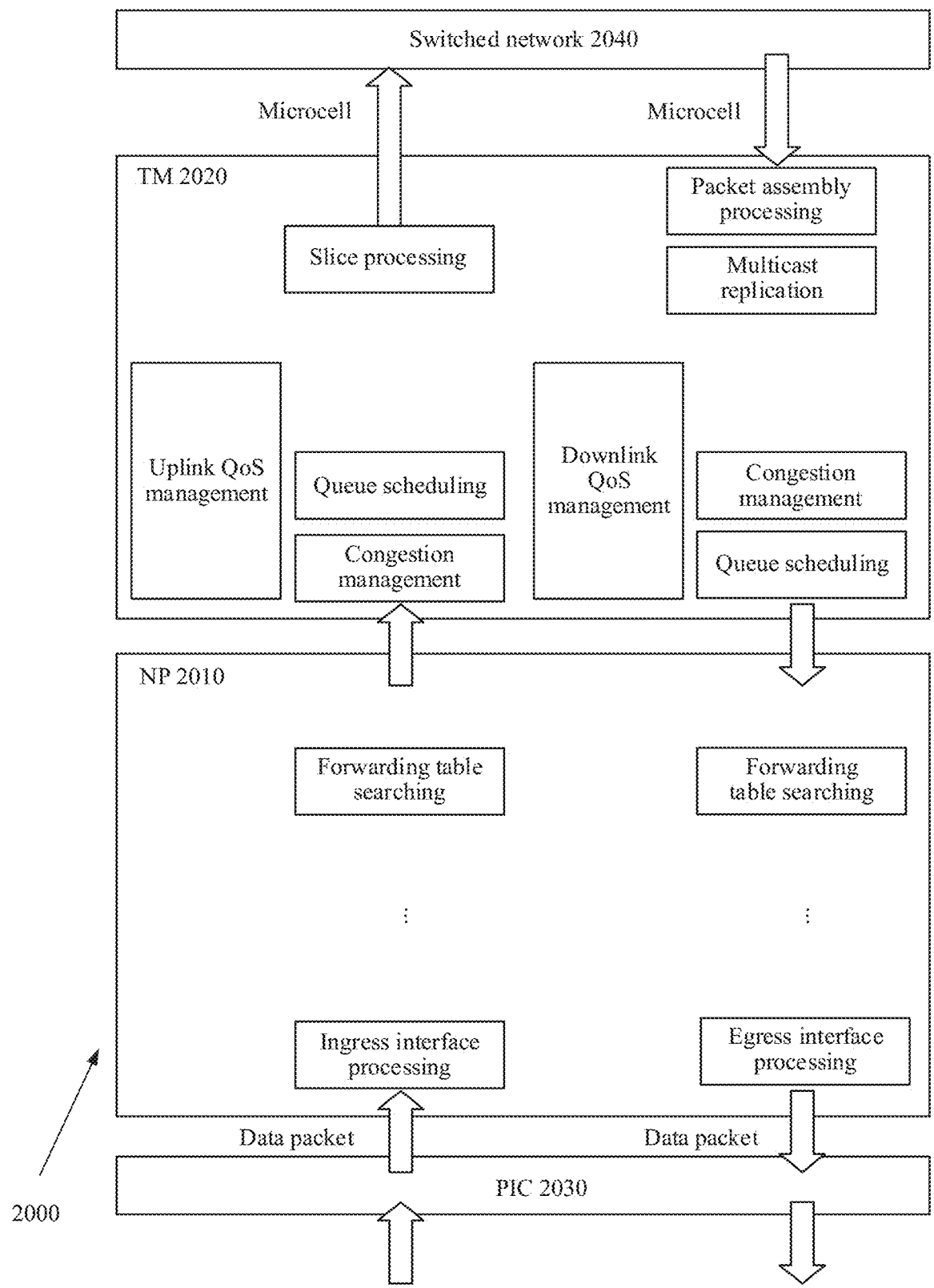
FIG. 20 is a schematic diagram of a structure of an interface board in the network device shown in FIG. 19 according to an embodiment of this application.

FIG. 20 is a schematic diagram of a structure of an interface board 2000 in the network device shown in FIG. 19 according to an embodiment of this application. The network device in which the interface board 2000 is located may be any SFF or service function chain ingress node in the embodiments shown in FIG. 1 to FIG. 15. The interface board 2000 may include a physical interface card (PIC) 2030, a network processor (NP) 2010, and a traffic management module 2020.

The physical interface card PIC (PIC) is configured to implement a physical layer interconnection function. Original traffic enters an interface board of the network device via the PIC, and a processed packet is sent from the PIC.

The network processor NP 2010 is configured to implement packet forwarding processing. Specifically, uplink packet processing includes packet ingress interface processing, and forwarding table searching (for example, obtaining the configuration information of the second virtual resource module for implementing the second service function in the foregoing embodiments); and downlink packet processing includes forwarding table searching (for example, obtaining the configuration information of the second virtual resource module for implementing the second service function in the foregoing embodiments), and the like.

The traffic management TM module 2020 is configured to implement functions such as QoS, line-rate forwarding, large-capacity buffering, and queue management. Specifically, uplink traffic management includes uplink QoS processing (such as congestion management and queue scheduling) and slice processing; and downlink traffic management includes packet assembly processing, multicast replication, and downlink QoS processing (such as congestion management and queue scheduling).

It may be understood that if the network device includes a plurality of interface boards 2000, the plurality of interface boards 2000 may communicate with each other through a switched network 2040.

It should be noted that FIG. 20 shows only an example of a processing procedure or modules inside the NP. A processing sequence of the modules in a specific implementation is not limited thereto. In addition, in actual application, another module or processing procedure may be deployed based on a requirement. This is not limited in this application.

Figure 21:
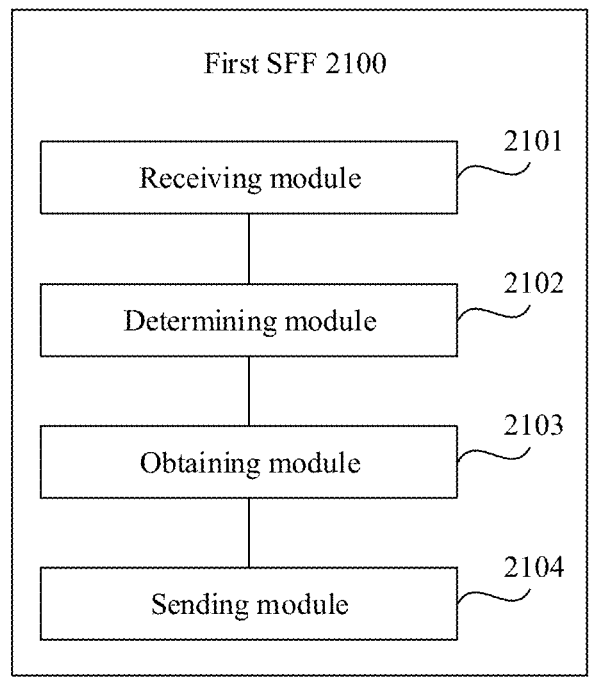
FIG. 21 is a schematic diagram of a structure of a first SFF according to an embodiment of this application.

FIG. 21 is a schematic diagram of a structure of a first SFF in a communications network according to an embodiment of this application. The first SFF is any SFF connected to one or more first virtual resource modules, the communications network further includes one or more second SFFs, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

As shown in FIG. 21, the first SFF 2100 includes:

a receiving module 2101, configured to receive a packet sent by one first virtual resource module connected to the first SFF, where for a specific implementation, refer to step 307 in the embodiment in FIG. 3A and FIG. 3B, step 901 in the embodiment in FIG. 9, and step 1501 in the embodiment in FIG. 15;

a determining module 2102, configured to determine the second service function based on the packet, where for a specific implementation, refer to step 307 in the embodiment in FIG. 3A and FIG. 3B, step 901 in the embodiment in FIG. 9, and step 1501 in the embodiment in FIG. 15;

an obtaining module 2103, configured to obtain configuration information of the second virtual resource module for implementing the second service function, where for a specific implementation, refer to step 308 in the embodiment in FIG. 3A and FIG. 3B, step 902 in the embodiment in FIG. 9, and step 1502 in the embodiment in FIG. 15; and a sending module 2104, configured to forward, based on the configuration information of the second virtual resource module, the packet to one second virtual resource module connected to the first SFF or one of the one or more second SFFs, where for a specific implementation, refer to step 309 in the embodiment in FIG. 3A and FIG. 3B, step 903 in the embodiment in FIG. 9, and steps 1503 and 1504 in the embodiment in FIG. 15.

Optionally, the configuration information of the second virtual resource module includes an identifier and a weight of each second virtual resource module connected to the first SFF, an identifier of each of the one or more second SFFs, and a weight of a second resource module connected to each second SFF.

In this case, the sending module is configured to forward, based on the identifier and the weight of each second virtual resource module connected to the first SFF, the identifier of each of the one or more second SFFs, and the weight of the second resource module connected to each second SFF, the packet to the one second virtual resource module connected to the first SFF or the one of the one or more second SFFs.

Optionally, the configuration information of the second virtual resource module includes an identifier of each of the one or more second SFFs and a weight of a second resource module connected to each second SFF.

In this case, the sending module is configured to forward the packet to the one of the one or more second SFFs based on the weight of the second resource module connected to each second SFF.

Optionally, the configuration information of the second virtual resource module includes a plurality of entries, the plurality of entries include one or more local entries and one or more remote entries, each of the one or more local entries includes an identifier of the one second virtual resource module connected to the first SFF and a weight of the one second virtual resource module connected to the first SFF, and each of the one or more remote entries includes an identifier of one second SFF and a weight of a second virtual resource module connected to the second SFF corresponding to the identifier of the one second SFF.

In this case, the sending module is configured to: determine, based on weights in the plurality of entries by using a hash algorithm, a first entry for forwarding the packet, where the first entry is one of the plurality of entries; and forward, based on the first entry, the packet to the one second virtual resource module connected to the first SFF or the one of the one or more second SFFs.

Optionally, the weight of the one second virtual resource module connected to the first SFF is a quantity 1, and the weight of the second virtual resource module connected to the second SFF corresponding to the identifier of the one second SFF is a quantity of second virtual resource modules connected to the second SFF corresponding to the identifier of the one second SFF; and the hash algorithm satisfies a condition that a ratio between probabilities of matching the packet with entities in the plurality of entries is the same as a ratio between quantities in entries in the plurality of entries.

Optionally, the identifier of the one second virtual resource module connected to the first SFF is an interface identifier of the one second virtual resource module connected to the first SFF, and the identifier of the second SFF is a SID of the second SFF.

In this case, the sending module is configured to: forward, based on the interface identifier that is of the one second virtual resource module connected to the first SFF and that is included in the first entry and through a port indicated by the interface identifier, the packet to the one second virtual resource module connected to the first SFF: or forward, based on the SID that is of the second SFF and that is included in the first entry, the packet to the second SFF indicated by the SID in the first entry.

Optionally, the configuration information of the second virtual resource module includes at least two remote entries, and each of the at least two remote entries includes an identifier of one second SFF and a weight of a second virtual resource module connected to the second SFF corresponding to the identifier of the one second SFF.

In this case, the sending module is configured to: determine, based on weights in the at least two remote entries by using a hash algorithm, a second entry for forwarding the packet, where the second entry is one of the at least two remote entries; and forward, based on the second entry, the packet to the SFF corresponding to the identifier that is of the second SFF and that is in the second entry.

Optionally, the weight of the second virtual resource module connected to the second SFF corresponding to the identifier of the one second SFF is a quantity of second virtual resource modules connected to the second SFF corresponding to the identifier of the one second SFF; and the hash algorithm satisfies a condition that a ratio between probabilities of matching the packet with remote entries in the at least two remote entries is the same as a ratio between quantities in remote entries in the at least two remote entries.

Optionally, the identifier of the one second SFF is a SID of the one second SFF.

Optionally, the receiving module is further configured to receive SID notification information advertised by each of the one or more second SFFs, where the SID notification information includes an identifier of a second SFF that advertises the SID notification information and a weight of a second virtual resource module connected to the second SFF that advertises the SID notification information. In this case, the first SFF further includes a creation module, configured to create, based on the SID notification information advertised by each second SFF, a remote entry corresponding to each second SFF.

Optionally, the obtaining module is further configured to obtain the identifier and the weight of each second virtual resource module connected to the first SFF. In this case, the creation module is further configured to create, based on the identifier and the weight of each second virtual resource module connected to the first SFF, a local entry corresponding to each second virtual resource module.

Optionally, the sending module is further configured to advertise SID notification information to each of the one or more second SFFs, where the SID notification information includes a weight of a second virtual resource module connected to the first SFF and an identifier of the first SFF.

Optionally, the SID notification information is carried in a locator type-length-value TLV, the locator TLV includes a sub-TLV, the sub-TLV includes a SID field and a resource weight field, the SID field is used to indicate an identifier of an SFF that advertises the locator TLV, and the resource weight field is used to indicate a weight of a second virtual resource module connected to the SFF that advertises the locator TLV.

Optionally, the configuration information of the second virtual resource module includes an identifier of each second virtual resource module connected to the first SFF and an identifier of each second virtual resource module connected to the one or more second SFFs, or an identifier of each second virtual resource module connected to the one or more second SFFs.

In this case, the sending module is configured to: select an identifier of one second virtual resource module according to a load balancing policy; and forward, based on the selected identifier of the second virtual resource module, the packet to the one second virtual resource module connected to the first SFF or the one of the one or more second SFFs.

Optionally, the configuration information of the second virtual resource module includes a plurality of entries, and each entry includes an identifier of one second virtual resource module connected to the first SFF or any second SFF.

In this case, the sending module is configured to determine, by using a hash algorithm, a first entry for forwarding the packet, where the first entry includes the selected identifier of the second virtual resource module, the first entry is one of the plurality of entries, and the hash algorithm satisfies a condition that probabilities of matching the packet with entries in the plurality of entries are the same.

Optionally, the identifier of each second virtual resource module is a SID of each second virtual resource module.

In this case, the sending module is configured to: forward, based on an interface identifier that is of the second virtual resource module and that is indicated by the selected SID of the second virtual resource module and through a port indicated by the interface identifier, the packet to the one second virtual resource module connected to the first SFF: or forward, based on a destination address indicated by the selected SID of the second virtual resource module, the packet to a second SFF connected to a selected second virtual resource module.

Optionally, the receiving module is further configured to receive SID notification information advertised by each of the one or more second SFFs, where the SID notification information includes an identifier of each second virtual resource module connected to a second SFF that advertises the SID notification information. In this case, the first SFF further includes a creation module, configured to create, based on the SID notification information advertised by each second SFF, an entry corresponding to each second virtual resource module connected to each second SFF.

Optionally, the obtaining module is further configured to obtain the identifier of each of the one or more second virtual resource modules connected to the first SFF. In this case, the creation module is further configured to create, based on the identifier of each of the one or more second virtual resource modules connected to the first SFF, an entry corresponding to each of the one or more second virtual resource modules connected to the first SFF.

Optionally, the sending module is further configured to advertise SID notification information to each of the one or more second SFFs, where the SID notification information includes one or more identifiers of the one or more second virtual resource modules connected to the first SFF.

Optionally, the SID notification information is carried in a locator type-length-value TLV, the locator TLV includes a sub-TLV, the sub-TLV includes a SID field, the SID field is used to indicate an identifier of an SFF that advertises the locator TLV, the sub-TLV includes a sub-sub-TLV, the sub-sub-TLV includes a SID field, and the SID field in the sub-sub-TLV is used to indicate an identifier of a second virtual resource module connected to the SFF that advertises the locator TLV.

In some embodiments of this application, an SFF connected to the second virtual resource module in the communications network is one or more second SFFs, or one or more second SFFs and a first SFF. Therefore, the configuration information of the second virtual resource module includes at least configuration information of the second virtual resource module connected to the second SFF in the communications network. In this way, when receiving a packet sent by any second virtual resource module connected to the first SFF, the first SFF may dynamically determine a forwarding path of the packet based on the configuration information of the virtual resource module for implementing the second service function, to implement dynamic load balancing on the packet instead of uniformly performing load balancing by a service function chain ingress node, so as to reduce pressure on the service function chain ingress node. In addition, even if the virtual resource module configured for the second service function changes, the first SFF may also dynamically perform load balancing provided that the configuration information of the second virtual resource module is updated in a timely manner, and a control node does not need to re-orchestrate all segment routing policies, to simplify a processing process in this scenario, and improve packet forwarding efficiency in this scenario.

It should be noted that, when the first SFF provided in the foregoing embodiment forwards a service packet, only division into the foregoing functional modules is used as an example for description. In actual application, the foregoing functions may be allocated to different functional modules for implementation based on a requirement, that is, an internal structure of a device is divided into different functional modules, to complete all or some of the functions described above. In addition, the first SFF provided in the foregoing embodiment and the service packet forwarding method embodiment belong to a same concept. For a specific implementation process of the first SFF, refer to the method embodiment. Details are not described herein again.

Figure 22:
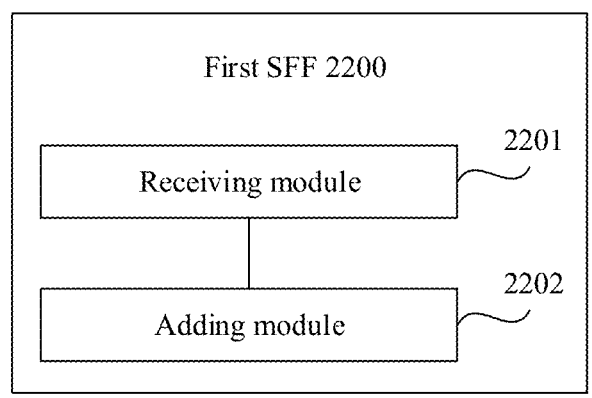
FIG. 22 is a schematic diagram of a structure of another first SFF according to an embodiment of this application.

FIG. 22 is a schematic diagram of a structure of a first SFF in a communications network according to an embodiment of this application. The first SFF is any SFF connected to one or more first virtual resource modules, the communications network further includes one or more second SFFs, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

As shown in FIG. 22, the first SFF 2200 includes:
a receiving module 2201, configured to receive SID notification information advertised by any one of the one or more second SFFs, where the SID notification information is used to indicate configuration information of a second virtual resource module connected to the any second SFF, where for a specific implementation, refer to step 403 in the embodiment shown in FIG. 4 and step 1203 in the embodiment shown in FIG. 12; and an adding module 2202, configured to add the configuration information of the second virtual resource module connected to the any second SFF to configuration information of the second virtual resource module for implementing the second service function, where for a specific implementation, refer to step 403 in the embodiment shown in FIG. 4 and step 1203 in the embodiment shown in FIG. 12.

Optionally, the configuration information of the second virtual resource module for implementing the second service function includes a plurality of entries, the plurality of entries include one or more remote entries, and the SID notification information includes an identifier of the any second SFF and a weight of the second virtual resource module connected to the any second SFF.

In this case, the adding module is configured to:
create, based on the SID notification information advertised by the any second SFF, a remote entry corresponding to the any second SFF, where the created remote entry includes the identifier of the any second SFF and the weight of the second virtual resource module connected to the any second SFF.

Optionally, the plurality of entries further include one or more local entries. In this case, the first SFF further includes:
an obtaining module, configured to obtain an identifier and a weight of each second virtual resource module connected to the first SFF.

The adding module is further configured to create, based on the identifier and the weight of each second virtual resource module connected to the first SFF, a local entry corresponding to each second virtual resource module connected to the first SFF, where each created local entry includes an identifier and a weight of a corresponding second virtual resource module.

Optionally, the first SFF further includes a sending module, configured to advertise SID notification information to each of the one or more second SFFs, where the SID notification information includes a weight of a second virtual resource module connected to the first SFF and an identifier of the first SFF.

Optionally, the SID notification information is carried in a locator type-length-value TLV, the locator TLV includes a sub-TLV, the sub-TLV includes a SID field and a resource weight field, the SID field is used to indicate a weight of an SFF that advertises the locator TLV, and the resource weight field is used to indicate a weight of a first virtual resource module connected to the SFF that advertises the locator TLV.

Optionally, the weight of the second virtual resource module connected to the any second SFF is a quantity of second virtual resource modules connected to the any second SFF, and the weight of each second virtual resource module connected to the first SFF is a quantity 1.

Optionally, the configuration information of the second virtual resource module for implementing the second service function includes an identifier of each second virtual resource module connected to the first SFF and an identifier of each second virtual resource module connected to the one or more second SFFs, and the SID notification information includes an identifier of each of the one or more second virtual resource modules connected to the any second SFF.

In this case, the adding module is configured to create, by the first SFF based on the SID notification information advertised by the any second SFF, an entry corresponding to each second virtual resource module connected to the any second SFF, where each created entry includes an identifier of a corresponding second virtual resource module.

Optionally, the first SFF further includes:
an obtaining module, configured to obtain an identifier of each of the one or more second virtual resource modules connected to the first SFF.

The adding module is configured to create, based on the identifier of each of the one or more second virtual resource modules connected to the first SFF, an entry corresponding to each of the one or more second virtual resource modules connected to the first SFF, where each created entry includes an identifier of a corresponding second virtual resource module.

Optionally, the first SFF further includes:
a sending module, configured to advertise SID notification information to each of the one or more second SFFs, where the SID notification information includes an identifier of each of the one or more second virtual resource modules connected to the first SFF.

Optionally, the SID notification information is carried in a locator type-length-value TLV, the locator TLV includes a sub-TLV, a SID field in the sub-TLV is used to indicate a SID of an SFF that advertises the locator TLV, the sub-TLV includes a sub-sub-TLV, and a SID field in the sub-sub-TLV is used to indicate an identifier of a second virtual resource module connected to the SFF that advertises the locator TLV.

In some embodiments of this application, an SFF connected to the second virtual resource module in the communications network is one or more second SFFs, or one or more second SFFs and a first SFF. Therefore, the configuration information of the second virtual resource module includes at least configuration information of the second virtual resource module connected to the second SFF in the communications network. In this way, when receiving a packet sent by any second virtual resource module connected to the first SFF, the first SFF may dynamically determine a forwarding path of the packet based on the configuration information of the virtual resource module for implementing the second service function, to implement dynamic load balancing on the packet instead of uniformly performing load balancing by a service function chain ingress node, so as to reduce pressure on the service function chain ingress node. In addition, even if the virtual resource module configured for the second service function changes, the first SFF may also dynamically perform load balancing provided that the configuration information of the second virtual resource module is updated in a timely manner, and a control node does not need to re-orchestrate all segment routing policies, to simplify a processing process in this scenario, and improve packet forwarding efficiency in this scenario.

It should be noted that, when the first SFF provided in the foregoing embodiment forwards a service packet, only division into the foregoing functional modules is used as an example for description. In actual application, the foregoing functions may be allocated to different functional modules for implementation based on a requirement, that is, an internal structure of a device is divided into different functional modules, to complete all or some of the functions described above. In addition, the first SFF provided in the foregoing embodiment and the service packet forwarding method embodiment belong to a same concept. For a specific implementation process of the first SFF, refer to the method embodiment. Details are not described herein again.

In addition, an embodiment of this application further provides any one of one or more second SFFs in a communications network. The communications network further includes a first SFF, the first SFF is any SFF connected to one or more first virtual resource modules, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

The second SFF includes:
a receiving module, configured to receive a packet sent by the first SFF;
a determining module, configured to determine the second service function based on the packet;
an obtaining module, configured to obtain configuration information of the second virtual resource module for implementing the second service function; and
a sending module, configured to forward, based on the configuration information of the second virtual resource module, the packet to one second virtual resource module connected to the second SFF.

For a detailed implementation of functions of the second SFF, refer to the embodiments shown in FIG. 3A and FIG. 3B to FIG. 15. Details are not described herein again.

In addition, an embodiment of this application further provides a control node in a communications network. The communications network further includes a service function chain ingress node.

The control node includes:
a determining module, configured to determine a segment routing policy, where the segment routing policy is used to indicate a plurality of service functions on a service function chain; and
a sending module, configured to deliver the segment routing policy to the service function chain ingress node, so that the service function chain ingress node adds the segment routing policy to a packet header of a received packet.

For a detailed implementation of functions of the control node, refer to the embodiment shown in FIG. 3A and FIG. 3B. Details are not described herein again.

In addition, an embodiment of this application further provides a service function chain ingress node in a communications network. The communications network further includes a control node.

The service function chain ingress node includes:
a receiving module, configured to receive a segment routing policy delivered by the control node, where the segment routing policy is used to indicate a plurality of service functions on a service function chain, where the receiving module is further configured to: receive a packet, and add the segment routing policy to a packet header of the packet;
an obtaining module, configured to obtain configuration information of a first virtual resource module for implementing a first service function, where the first virtual resource module is a virtual resource module for implementing the first service function, and the first service function is a $1^{st}$ service function on the service function chain; and
a sending module, configured to forward, based on the configuration information of all the first virtual resource modules, the packet to one SFF connected to the first virtual resource module.

For a detailed implementation of functions of the service function chain ingress node, refer to the embodiment shown in FIG. 3A and FIG. 3B. Details are not described herein again.

In addition, an embodiment of this application further provides a service packet forwarding system. The system includes a first SFF and one or more second SFFs, the first SFF is any SFF connected to one or more first virtual resource modules, and each second SFF is connected to one or more second virtual resource modules, or each second SFF is connected to one or more second virtual resource modules, and the first SFF is also connected to one or more second virtual resource modules. The first virtual resource module is a virtual resource module for implementing a first service function, and the second virtual resource module is a virtual resource module for implementing a second service function.

Any one of the one or more second SFFs is configured to advertise SID notification information, where the SID notification information is used to indicate configuration information of a second virtual resource module connected to the any second SFF.

The first SFF is configured to: receive the SID notification information, and add the configuration information of the second virtual resource module connected to the any second SFF to configuration information of the second virtual resource module for implementing the second service function.

Optionally, the configuration information of the second virtual resource module includes a plurality of entries, the plurality of entries include one or more remote entries, and the SID notification information includes an identifier of the any second SFF and a weight of the second virtual resource module connected to the any second SFF. In this case, the first SFF is configured to create, based on the SID notification information advertised by the any second SFF, a remote entry corresponding to the any second SFF, where the created remote entry includes the identifier of the any second SFF and the weight of the second virtual resource module connected to the any second SFF.

Optionally, the plurality of entries further include one or more local entries. In this case, the first SFF is further configured to: obtain an identifier and a weight of each second virtual resource module connected to the first SFF; and create, based on the identifier and the weight of each second virtual resource module connected to the first SFF, a local entry corresponding to each second virtual resource module connected to the first SFF, where each created local entry includes an identifier and a weight of a corresponding second virtual resource module.

Optionally, the first SFF is further configured to advertise SID notification information to each of the one or more second SFFs, where the notification information includes a weight of a second virtual resource module connected to the first SFF and an identifier of the first SFF.

Optionally, the SID notification information is carried in a locator type-length-value TLV, the locator TLV includes a sub-TLV, the sub-TLV includes a SID field and a resource weight field, the SID field is used to indicate a weight of an SFF that advertises the locator TLV, and the resource weight field is used to indicate a weight of a first virtual resource module connected to the SFF that advertises the locator TLV.

Optionally, the weight of the second virtual resource module connected to the any second SFF is a quantity of second virtual resource modules connected to the any second SFF, and the weight of each second virtual resource module connected to the first SFF is a quantity 1.

Optionally, the configuration information of the second virtual resource module includes an identifier of each second virtual resource module connected to the first SFF and an identifier of each second virtual resource module connected to the one or more second SFFs, and the SID notification information includes an identifier of each of the one or more second virtual resource modules connected to the any second SFF. In this case, the first SFF is configured to create, based on the SID notification information advertised by the any second SFF, an entry corresponding to each second virtual resource module connected to the any second SFF, where each created entry includes an identifier of a corresponding second virtual resource module.

Optionally, the first SFF is further configured to: obtain an identifier of each of the one or more second virtual resource modules connected to the first SFF; and create, based on the identifier of each of the one or more second virtual resource modules connected to the first SFF, an entry corresponding to each of the one or more second virtual resource modules connected to the first SFF, where each created entry includes an identifier of a corresponding second virtual resource module.

Optionally, the first SFF is further configured to advertise SID notification information to each of the one or more second SFFs, where the notification information includes an identifier of each of the one or more second virtual resource modules connected to the first SFF.

Optionally, the SID notification information is carried in a locator type-length-value TLV, the locator TLV includes a sub-TLV, a SID field in the sub-TLV is used to indicate a SID of an SFF that advertises the locator TLV, the sub-TLV includes a sub-sub-TLV, and a SID field in the sub-sub-TLV is used to indicate an identifier of a second virtual resource module connected to the SFF that advertises the locator TLV.

In addition, the system may further include a control node and a service function chain ingress node.

Functions of the first SFF, the second SFF, the control node, and the service function chain ingress node are described in detail in the foregoing embodiments, and are not described herein again.

Figure 23:
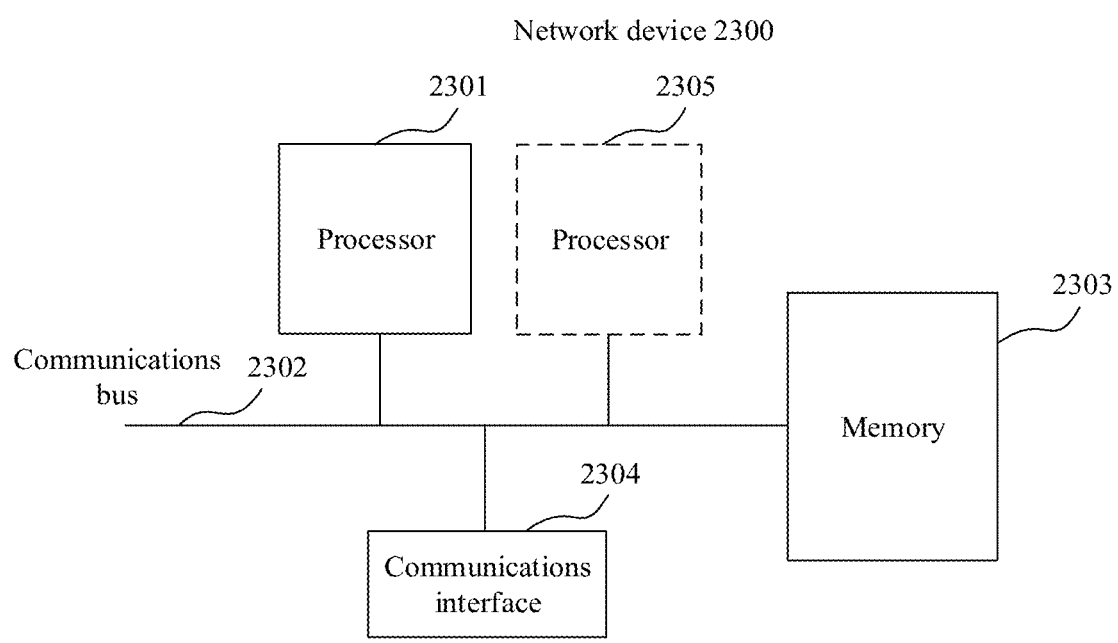
FIG. 23 is a schematic diagram of a structure of a network device according to an embodiment of this application.

FIG. 23 is a schematic diagram of a structure of a network device 2300 according to an embodiment of this application. The service function chain ingress node, the first SFF, and the second SFF in the embodiments in FIG. 1 to FIG. 17 may all be implemented by using the network device 2300 shown in FIG. 23. In this case, the network device 2300 may be a switch, a router, or another network device that forwards a packet. In addition, the control node in the embodiments in FIG. 1 to FIG. 17 may also be implemented by using the network device 2300 shown in FIG. 23. In this case, for a specific function of the network device 2300, refer to a specific implementation of the control node in any one of the embodiments in FIG. 1 to FIG. 17. Details are not described herein again. Refer to FIG. 23. The device includes at least one processor 2301, a communications bus 2302, a memory 2303, and at least one communications interface 2304.

The processor 2301 may be a general-purpose central processing unit (CPU), an application-specific integrated circuit (ASIC), or one or more integrated circuits for controlling program execution of the solutions of this application.

The communications bus 2302 may include a path for transmitting information between the foregoing components.

The memory 2303 may be a read-only memory (read-only memory, ROM) or another type of static storage device that can store static information and instructions, or a random access memory (RAM) or another type of dynamic storage device that can store information and instructions. The memory 2303 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk or another magnetic storage device, or any other medium that can be used to carry or store expected program code in a form of an instruction or a data structure and that can be accessed by a computer. However, the memory 2303 is not limited thereto. The memory 2303 may exist independently, and is connected to the processor 2301 through the communications bus 2302. Alternatively, the memory 2303 may be integrated into the processor 2301.

The memory 2303 is configured to store program code, and execution is controlled by the processor 2301, to perform the path detection method provided in any one of the foregoing embodiments. The processor 2301 is configured to execute the program code stored in the memory 2303. The program code may include one or more software modules. Any node shown in the communications network in FIG. 2 may determine, by using the processor 2301 and the one or more software modules in the program code in the memory 2303, data used for developing an application. The one or more software modules may be the software modules provided in either of the embodiments in FIG. 21 and FIG. 22.

The communications interface 2304 is any apparatus such as a transceiver, and is configured to communicate with another device or a communications network such as the Ethernet, a radio access network (RAN), or a wireless local area network (WLAN).

In a specific implementation, in an embodiment, the network device may include a plurality of processors, for example, the processor 2301 and a processor 2305 that are shown in FIG. 23. Each of the processors may be a single-core processor (single-CPU) or a multi-core processor (multi-CPU). The processor herein may be one or more devices, circuits, and/or processing cores configured to process data (for example, computer program instructions).

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A service packet forwarding method, applied to a first service function forwarder (SFF) in a communications network, wherein the first SFF is connected to one or more first virtual resource modules, the communications network further comprises one or more second SFFs, and each second SFF is connected to one or more second virtual resource modules, and the first SFF is also connected to the one or more second virtual resource modules; each of the one or more first virtual resource module is a virtual resource module for implementing a first service function, and each of the one or more second virtual resource module is a virtual resource module for implementing a second service function the method comprising:
receiving, by the first SFF, a packet sent by one first virtual resource module connected to the first SFF;
determining, by the first SFF, the second service function based on the packet;
obtaining, by the first SFF, configuration information of one second virtual resource module for implementing the second service function, wherein the configuration information of the second virtual resource module comprises an identifier of each of the one or more second SFFs, and a weight of a second virtual resource module connected to each second SFF; and
forwarding, by the first SFF based on the configuration information of the second virtual resource module, the packet to one second virtual resource module connected to the first SFF or one of the one or more second SFFs.

2. The method according to claim 1, wherein the configuration information of the second virtual resource module further comprises an identifier and a weight of each second virtual resource module connected to the first SFF; and
the forwarding, by the first SFF based on the configuration information of the second virtual resource module, the packet to one second virtual resource module connected to the first SFF or one of the one or more second SFFs comprises:
forwarding, by the first SFF based on the identifier and the weight of each second virtual resource module connected to the first SFF, the identifier of each of the one or more second SFFs, and the weight of the second resource module connected to each second SFF, the packet to the one second virtual resource module connected to the first SFF or the one of the one or more second SFFs.

3. The method according to claim 2, wherein the configuration information of the second virtual resource module comprises a plurality of entries, the plurality of entries comprises one or more local entries and one or more remote entries, each of the one or more local entries comprises an identifier of the one second virtual resource module connected to the first SFF and a weight of the one second virtual resource module connected to the first SFF, and each of the one or more remote entries comprises an identifier of one second SFF and a weight of a second virtual resource module connected to the second SFF corresponding to the identifier of the one second SFF; and
the forwarding, by the first SFF based on the identifier and the weight of each second virtual resource module connected to the first SFF, the identifier of each of the one or more second SFFs, and the weight of the second resource module connected to each second SFF, the packet to the one second virtual resource module connected to the first SFF comprises:
determining, by the first SFF based on weights in the plurality of entries by using a hash algorithm, a first entry for forwarding the packet, wherein the first entry is one of the plurality of entries; and
forwarding, by the first SFF based on the first entry, the packet to the one second virtual resource module connected to the first SFF or the one of the one or more second SFFs.

4. The method according to claim 3, wherein the weight of the one second virtual resource module connected to the first SFF is 1, and the weight of the second virtual resource module connected to the second SFF corresponding to the identifier of the one second SFF is a quantity of second virtual resource modules connected to the second SFF corresponding to the identifier of the one second SFF; and
the hash algorithm satisfies a condition that a ratio between probabilities of matching the packet with entities in the plurality of entries is the same as a ratio between quantities in entries in the plurality of entries.

5. The method according to claim 3, wherein the identifier of the one second virtual resource module connected to the first SFF is an interface identifier of the one second virtual resource module connected to the first SFF, and the identifier of the second SFF is a segment identifier (SID) of the second SFF; and
the forwarding, by the first SFF based on the first entry, the packet to the one second virtual resource module connected to the first SFF or the one of the one or more second SFFs comprises:
forwarding, by the first SFF based on the interface identifier that is of the one second virtual resource module connected to the first SFF and that is comprised in the first entry and through a port indicated by the interface identifier, the packet to the one second virtual resource module connected to the first SFF; or forwarding, by the first SFF based on the SID that is of the second SFF and that is comprised in the first entry, the packet to the second SFF indicated by the SID in the first entry.

6. The method according to claim 3, wherein the method further comprises:
receiving, by the first SFF, SID notification information advertised by each of the one or more second SFFs, wherein the SID notification information comprises an identifier of a second SFF that advertises the SID notification information and a weight of a second virtual resource module connected to the second SFF that advertises the SID notification information; and
creating, by the first SFF based on the SID notification information advertised by each second SFF, a remote entry corresponding to each second SFF.

7. The method according to claim 6, wherein the SID notification information is carried in a locator type-length-value (TLV), the locator TLV comprises a sub-TLV, the sub-TLV comprises a SID field and a resource weight field, the SID field is used to indicate an identifier of an SFF that advertises the locator TLV, and the resource weight field is used to indicate a weight of a second virtual resource module connected to the SFF that advertises the locator TLV.

8. The method according to claim 3, wherein the method further comprises:
obtaining, by the first SFF, the identifier and the weight of each second virtual resource module connected to the first SFF; and
creating, by the first SFF based on the identifier and the weight of each second virtual resource module connected to the first SFF, a local entry corresponding to each second virtual resource module.

9. The method according to claim 8, wherein the method further comprises:
advertising, by the first SFF, SID notification information to each of the one or more second SFFs, wherein the SID notification information comprises a weight of a second virtual resource module connected to the first SFF and an identifier of the first SFF.

10. The method according to claim 1, wherein the configuration information of the second virtual resource module comprises at least two remote entries, and each of the at least two remote entries comprises an identifier of one second SFF and a weight of a second virtual resource module connected to the second SFF corresponding to the identifier of the one second SFF; and
the forwarding, by the first SFF, the packet to the one of the one or more second SFFs based on the weight of the second resource module connected to each second SFF comprises:
determining, by the first SFF based on weights in the at least two remote entries by using a hash algorithm, a second entry for forwarding the packet, wherein the second entry is one of the at least two remote entries; and
forwarding, by the first SFF based on the second entry, the packet to the SFF corresponding to the identifier that is of the one second SFF and that is in the second entry.

11. The method according to claim 10, wherein the weight of the second virtual resource module connected to the second SFF corresponding to the identifier of the one second SFF is a quantity of second virtual resource modules connected to the second SFF corresponding to the identifier of the one second SFF; and
the hash algorithm satisfies a condition that a ratio between probabilities of matching the packet with remote entries in the at least two remote entries is the same as a ratio between quantities in remote entries in the at least two remote entries.

12. The method according to claim 10, wherein the identifier of the one second SFF is a SID of the one second SFF.

13. The method according to claim 1, wherein the configuration information of the second virtual resource module comprises an identifier of each second virtual resource module connected to the first SFF and an identifier of each second virtual resource module connected to the one or more second SFFs, or an identifier of each second virtual resource module connected to the one or more second SFFs; and
the forwarding, by the first SFF based on the configuration information of the second virtual resource module, the packet to one second virtual resource module connected to the first SFF or one of the one or more second SFFs comprises:
selecting, by the first SFF, an identifier of one second virtual resource module according to a load balancing policy; and
forwarding, by the first SFF based on the selected identifier of the second virtual resource module, the packet to the one second virtual resource module connected to the first SFF or the one of the one or more second SFFs.

14. A service packet forwarding method, applied to a first service function forwarder (SFF) in a communications network, wherein the first SFF is connected to one or more first virtual resource modules, the communications network further comprises one or more second SFFs, and each second SFF is connected to one or more second virtual resource modules, and the first SFF is also connected to the one or more second virtual resource modules; the first virtual resource module is a virtual resource module for implementing a first service function, and the second virtual resource module is a virtual resource module for implementing a second service function; and
the method comprises:
receiving, by the first SFF, segment identifier (SID) notification information advertised by any one of the one or more second SFFs, wherein the SID notification information is used to indicate configuration information of a second virtual resource module connected to the any second SFF; and
adding, by the first SFF, the configuration information of the second virtual resource module connected to the any second SFF to configuration information of the second virtual resource module for implementing the second service function;
wherein the configuration information of the second virtual resource module for implementing the second service function comprises a plurality of entries, the plurality of entries comprises one or more remote entries, and the SID notification information comprises an identifier of the any second SFF and a weight of the second virtual resource module connected to the any second SFF; and
the adding, by the first SFF, the configuration information of the second virtual resource module connected to the any second SFF to configuration information of the second virtual resource module for implementing the second service function comprises:
creating, by the first SFF based on the SID notification information advertised by the any second SFF, a remote entry corresponding to the any second SFF, wherein the created remote entry comprises the identifier of the any second SFF and the weight of the second virtual resource module connected to the any second SFF.

15. A first service function forwarder (SFF) in a communications network, wherein the first SFF is connected to one or more first virtual resource modules, the communications network further comprises one or more second SFFs, and each second SFF is connected to one or more second virtual resource modules, and the first SFF is also connected to one or more second virtual resource modules; the first virtual resource module is a virtual resource module for implementing a first service function, and the second virtual resource module is a virtual resource module for implementing a second service function; and the first SFF comprises:

at least one processor; and one or more memories coupled to the at least one processor and configured to store instructions for execution by the at least one processor, wherein the instructions instruct the at least one processor to cause the first SFF to:

receive a packet sent by one first virtual resource module connected to the first SFF;

determine the second service function based on the packet;

obtain configuration information of the second virtual resource module for implementing the second service function, wherein the configuration information of the second virtual resource module comprises an identifier of each of the one or more second SFFs, and a weight of a second virtual resource module connected to each second SFF; and forward based on the configuration information of the second virtual resource module, the packet to one second virtual resource module connected to the first SFF or one of the one or more second SFFs.

16. The first SFF according to claim 15, wherein the configuration information of the second virtual resource module comprises an identifier and a weight of each second virtual resource module connected to the first SFF; and wherein the instructions instruct the at least one processor to further cause the first SFF to:

forward, based on the identifier and the weight of each second virtual resource module connected to the first SFF, the identifier of each of the one or more second SFFs, and the weight of the second resource module connected to each of the one or more second SFFs, the packet to the one second virtual resource module connected to the first SFF or the one of the one or more second SFFs.

* * * * *